(12) United States Patent
Nakamura

(10) Patent No.: US 11,491,890 B2
(45) Date of Patent: Nov. 8, 2022

(54) VEHICLE MANAGEMENT APPARATUS, VEHICLE, AND VEHICLE MANAGEMENT METHOD

(71) Applicant: Toyota Jidosha Kabushiki Kaisha, Toyota (JP)

(72) Inventor: Toru Nakamura, Toyota (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 164 days.

(21) Appl. No.: 16/984,361

(22) Filed: Aug. 4, 2020

(65) Prior Publication Data

US 2021/0039518 A1 Feb. 11, 2021

(30) Foreign Application Priority Data

Aug. 6, 2019 (JP) .............................. JP2019-144710

(51) Int. Cl.
*B60L 55/00* (2019.01)
*H02J 7/00* (2006.01)
*G07C 5/08* (2006.01)
*B60L 53/66* (2019.01)

(52) U.S. Cl.
CPC ............ *B60L 55/00* (2019.02); *G07C 5/0816* (2013.01); *H02J 7/0068* (2013.01); *B60L 53/665* (2019.02)

(58) Field of Classification Search
CPC ...... B60L 55/00; B60L 53/665; H02J 7/0068; G07C 5/0816
See application file for complete search history.

(56) References Cited

U.S. PATENT DOCUMENTS

| 9,352,662 | B2* | 5/2016 | Kaneyasu | ............... B60L 53/65 |
| 11,014,469 | B2* | 5/2021 | Kim | ...................... B60L 3/0046 |
| 2018/0186246 | A1 | 7/2018 | Kudo et al. | |
| 2019/0067961 | A1* | 2/2019 | King | ..................... H02J 7/0045 |

FOREIGN PATENT DOCUMENTS

| JP | 2009-159076 A | 7/2009 |
| JP | 2013-235377 A | 11/2013 |
| JP | 2014-187821 A | 10/2014 |
| JP | 6402256 B2 | 10/2018 |

\* cited by examiner

*Primary Examiner* — Richard V Muralidar
(74) *Attorney, Agent, or Firm* — Dinsmore & Shohl LLP

(57) ABSTRACT

A server performs a process including: when the server receives a second DR execution instruction, the step of obtaining a vehicle list; the step of turning off a determination flag of each candidate vehicle; the step of obtaining a number of times of turning on and off a relay at a time of DR for one of candidate vehicles each showing a determination flag in an OFF state; when the number of times of turning on and off the relay is greater than a threshold value, the step of turning on an exclusion flag; the step of performing a notification process; when a determining process ends, the step of performing a process of allocating a DR amount; and the step of transmitting a DR signal.

10 Claims, 11 Drawing Sheets

FIG.8

| VEHICLE ID | DR AMOUNT | NUMBER OF TIMES OF TURNING ON AND OFF RELAY AT TIME OF DR | DETERMINATION FLAG | EXCLUSION FLAG | ... |
|---|---|---|---|---|---|
| 001 | a | Ca | ON | OFF | ... |
| 002 | b | Cb | ON | OFF | ... |
| 003 | c | Cc | ON | OFF | ... |
| 004 | d | Cd | OFF | OFF | ... |
| ⋮ | ⋮ | ⋮ | ⋮ | ⋮ | |

FIG.9

| VEHICLE ID | DR AMOUNT | NUMBER OF TIMES OF TURNING ON AND OFF RELAY AT TIME OF DR | DETERMINATION FLAG | EXCLUSION FLAG | ... |
|---|---|---|---|---|---|
| 001 | a | Ca | OFF | OFF | ... |
| 002 | b | Cb | OFF | OFF | ... |
| 003 | c | Cc | OFF | OFF | ... |
| 004 | d | Cd | OFF | OFF | ... |
| ⋮ | ⋮ | ⋮ | ⋮ | ⋮ | |

↓ AFTER DR REQUEST IS RECEIVED MULTIPLE TIMES

| VEHICLE ID | DR AMOUNT | NUMBER OF TIMES OF TURNING ON AND OFF RELAY AT TIME OF DR | DETERMINATION FLAG | EXCLUSION FLAG | ... |
|---|---|---|---|---|---|
| 001 | a' | Ca' | ON | OFF | ... |
| 002 | — | Cb' | ON | ON | ... |
| 003 | c' | Cc' | ON | OFF | ... |
| 004 | d' | Cd' | ON | OFF | ... |
| ⋮ | ⋮ | ⋮ | ⋮ | ⋮ | |

↓ INITIALIZATION CONDITION SATISFACTION

RESET TO INITIAL VALUE

VEHICLE MANAGEMENT APPARATUS, VEHICLE, AND VEHICLE MANAGEMENT METHOD

CROSS REFERENCE TO RELATED APPLICATIONS

This nonprovisional application claims priority to Japanese Patent Application No. 2019-144710 filed on Aug. 6, 2019 with the Japan Patent Office, the entire contents of which are hereby incorporated by reference.

BACKGROUND

Field

The present disclosure relates to: a vehicle management apparatus that manages a vehicle capable of transmitting and receiving electric power to and from an external power grid; a vehicle; and a vehicle management method.

Description of the Background Art

Japanese Patent Laying-Open No. 2013-235377 discloses a technique for counting the number of times of the opening and closing operation by an incorporated relay, retaining the counted number as information about the number of times of the opening and closing operation, and providing an output of a signal corresponding to this information to an external connection device.

SUMMARY

In recent years, an electric power system dependent on a large-scale power plant (an intensive energy resource) possessed by electric power utility companies has been reconsidered. Thus, a scheme for utilizing an energy resource possessed by each demand side (hereinafter also referred to as a "demand side resource (DSR)") for an electric power system has been constructed. The DSR functions as a distributed energy resource (hereinafter also referred to as a "DER").

As the scheme of utilizing the DSR for an electric power system, a virtual power plant (VPP) is proposed. The VPP is a scheme implemented by bundling a large number of DERs (for example, DSRs) by an advanced energy management technique that utilizes IoT (Internet of things), and remotely controlling these DERs in an integrated manner so as to function as if these DERs are one power plant. The entity that bundles DERs and provides energy management service through the VPP is called as an "aggregator". The aggregator adjusts the balance between demand and supply of electric power by the method called as a demand response (hereinafter also referred to as a "DR") to thereby change the power demand pattern so as to allow levelling out of electric power.

The DR is a method of adjusting the power demand amount by issuing a demand response signal (hereinafter also referred to as a "DR signal") to request each demand side to level out electric power (that is, to suppress or increase power demand). The DR signal includes: a DR signal for requesting suppression of power demand (hereinafter also referred to as a "demand-suppressing DR signal"); and a DR signal for requesting increasing of power demand (hereinafter also referred to as a "demand-increasing DR signal"). For example, the aggregator can start adjustment of the power demand amount by transmitting a DR signal (that is, a demand-suppressing DR signal or a demand-increasing DR signal) to each demand side, and also can end adjustment of the power demand amount by transmitting a signal for cancelling the DR (hereinafter also referred to as a "DR cancellation signal") to each demand side. Furthermore, by transmitting a DR signal including a DR time period (that is, DR start time and DR end time) to each demand side, the aggregator also can start the DR at the DR start time and cancel the DR at the DR end time.

As a DSR for implementing a VPP, a vehicle including a power storage device (for example, an electric vehicle) has recently been attracting attention. In the case where the vehicle is requested by the aggregator to participate in DR during charging of the power storage device with electric power received from a power system (that is, a power grid provided by an electric power company) or during discharging of the power storage device for supplying electric power to the power grid, the vehicle can contribute to adjustment of the power demand amount by starting and stopping charging or by starting and stopping discharging.

However, when a relay mounted in the vehicle is switched to a closed state or an opened state each time charging or discharging is started and stopped at the time of participation in DR, the number of times of the relay operation may increase. As a result, the lifetime of the relay may be shortened. It is also conceivable to stop the operation of the relay in order not to increase the number of times of the relay operation, which however may prevent required power transmission and reception.

An object of the present disclosure is to provide a vehicle management apparatus, a vehicle, and a vehicle management method, which allow required power transmission and reception while suppressing shortening of the lifetime of the relay.

A vehicle management apparatus according to an aspect of the present disclosure is a vehicle management apparatus that manages a vehicle including a power storage device and allowing transmission and reception of electric power between the power storage device and a power grid external to the vehicle. The vehicle includes a relay that is brought into a closed state when transmission and reception of electric power between the power grid and the power storage device is requested, and that is brought into an opened state when transmission and reception of electric power between the power storage device and the power grid is requested to be stopped. The vehicle management apparatus obtains, from the vehicle, a number of switching times that is a number of times of performing a switching operation for switching a state of the relay between the opened state and the closed state from one to the other. When the number of switching times exceeds a threshold value, the vehicle management apparatus prohibits the switching operation corresponding to a transaction for electric power.

In this way, when the number of switching times exceeds the threshold value, the switching operation corresponding to the transaction for electric power is prohibited. Thereby, an increase in the number of times of switching the relay can be suppressed. Thus, shortening of the lifetime of the relay can be suppressed. Furthermore, since the switching operation not corresponding to the transaction for electric power is not prohibited, required power transmission and reception can be performed.

In a certain embodiment, when the number of switching times corresponding to the transaction for electric power exceeds the threshold value, the vehicle management apparatus prohibits the switching operation corresponding to the transaction for electric power and permits the switching operation not corresponding to the transaction for electric power.

In this way, an increase in the number of switching times corresponding to the transaction for electric power can be suppressed. Thus, shortening of the lifetime of the relay can be suppressed. Furthermore, since the switching operation not corresponding to the transaction for electric power is permitted, required power transmission and reception can be performed.

Furthermore, in a certain embodiment, the vehicle management apparatus sums numbers of switching times corresponding to the transaction for electric power until a prescribed time period elapses. When a sum of the numbers of switching times exceeds the threshold value, the vehicle management apparatus prohibits the switching operation corresponding to the transaction for electric power. When the prescribed time period elapses, the vehicle management apparatus sets the number of switching times back to an initial value.

In this way, an increase in the number of switching times corresponding to the transaction for electric power in a prescribed time period can be suppressed. Thus, shortening of the lifetime of the relay can be suppressed.

Furthermore, in a certain embodiment, the vehicle management apparatus calculates a remaining number of switchable times of the relay in a remaining utilization period of the vehicle based on an actual number of switching times of the relay in an actual utilization period of the vehicle and a number of switchable times of the relay in an expected utilization period of the vehicle. The remaining utilization period is calculated by subtracting the actual utilization period from the expected utilization period. The vehicle management apparatus calculates an estimated value of the number of switching times in the remaining utilization period based on the actual number of switching times in the actual utilization period. When the estimated value is greater than the remaining number of switchable times, the vehicle management apparatus prohibits the switching operation corresponding to the transaction for electric power.

In this way, it can be suppressed that the number of switching times exceeds the remaining number of switchable times by the time when the expected utilization period elapses. Thus, shortening of the lifetime of the relay can be suppressed.

Furthermore, in a certain embodiment, when the switching operation corresponding to the transaction for electric power is prohibited, the vehicle management apparatus notifies a user of the vehicle that the number of switching times exceeds the threshold value.

This allows the user of the vehicle to recognize that the switching operation corresponding to the transaction for electric power is prohibited because the number of switching times exceeds the threshold value.

Furthermore, in a certain embodiment, when electric power transmitted and received between the power grid and the vehicle is direct-current (DC) power, and when the number of switching times exceeds the threshold value, the vehicle management apparatus permits the switching operation.

In this way, for example, when the power storage device is charged with DC power, the switching operation is permitted. This allows the switching operation matching with an intention of the user who wants to immediately complete charging of the power storage device.

Furthermore, in a certain embodiment, the vehicle management apparatus prohibits the switching operation corresponding to the transaction for electric power, when electric power transmitted and received between the power grid and the vehicle is alternating-current (AC) power and when the number of switching times exceeds the threshold value. The vehicle management apparatus notifies a user of the vehicle that the number of switching times exceeds the threshold value, when electric power transmitted and received between the power grid and the vehicle is DC power and when the number of switching times exceeds the threshold value.

In this way, when the electric power transmitted and received between the power grid and the vehicle is AC power, the switching operation corresponding to the transaction for electric power is prohibited. Thereby, an increase in the number of switching times of the relay can be suppressed. Furthermore, when the electric power transmitted and received between the power grid and the vehicle is DC power, the user of the vehicle can recognize that the number of switching times exceeds the threshold value.

A vehicle according to another aspect of the present disclosure includes: a power storage device; a relay that is brought into a closed state when transmission and reception of electric power between a power grid external to the vehicle and the power storage device is requested, and brought into an opened state when transmission and reception of electric power between the power storage device and the power grid is requested to be stopped; and a controller that performs a switching operation for switching a state of the relay between the opened state and the closed state from one to the other. When a number of switching times that is a number of times of performing the switching operation exceeds a threshold value, the controller prohibits the switching operation corresponding to a transaction for electric power.

In a certain embodiment, in a case where the controller performs the switching operation not corresponding to a transaction for electric power with a prescribed customer, when the number of switching times corresponding to the transaction for electric power exceeds the threshold value, the controller permits the switching operation and notifies a user of the vehicle that the number of switching times corresponding to the transaction for electric power exceeds the threshold value.

In this way, when the switching operation not corresponding to the transaction for electric power with a prescribed customer is performed, the user of the vehicle can recognize that the number of switching times corresponding to the transaction for electric power exceeds the threshold value.

A vehicle management method according to still another aspect of the present disclosure is a method of managing a vehicle that includes a power storage device and allows transmission and reception of electric power between the power storage device and a power grid external to the vehicle. The vehicle includes a relay that is brought into a closed state when transmission and reception of electric power between the power grid and the power storage device is requested, and brought into an opened state when transmission and reception of electric power between the power storage device and the power grid is requested to be stopped. The vehicle management method includes: obtaining, from the vehicle, a number of switching times that is a number of times of performing a switching operation for switching a state of the relay between the opened state and the closed state from one to the other; and prohibiting the switching operation corresponding to a transaction for electric power when the number of switching times exceeds a threshold value.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a diagram showing the configuration of an example of a vehicle list.

FIG. 9 is a diagram for illustrating changes in the vehicle list.

DETAILED DESCRIPTION

Figure 1:
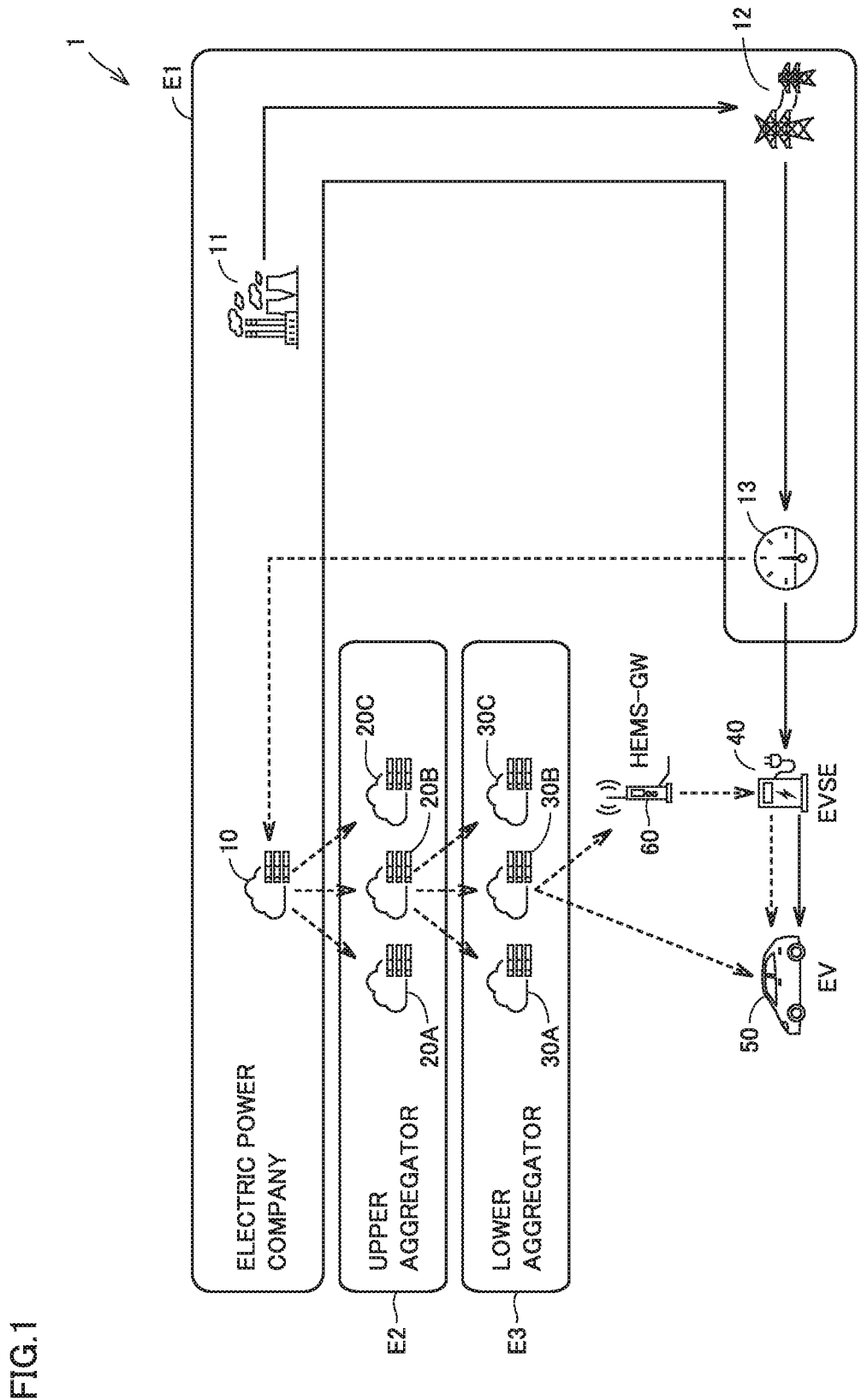
FIG. 1 is a diagram showing an example of the configuration of a VGI system including a vehicle management apparatus according to an embodiment of the present disclosure.

Embodiments of the present disclosure will be hereinafter described in detail with reference to the accompanying drawings, in which the same or corresponding components are designated by the same reference characters, and the description thereof will not be repeated.

FIG. 1 is a diagram showing an example of the configuration of a vehicle grid integration (VGI) system 1 including a vehicle management apparatus according to an embodiment of the present disclosure. The present embodiment will be described with regard to the case where the vehicle management apparatus is installed in a lower aggregator E3, by way of example. Referring to FIG. 1, VGI system 1 includes an electric power company E1, an upper aggregator E2, and a lower aggregator E3.

Electric power company E1 generates and supplies electric power. Electric power company E1 can gain profits, for example, by dealing with a demand side (for example, an individual or a company) that uses electric power. Electric power company E1 includes a server 10, a power plant 11, a power transmission and distribution facility 12, and a smart meter 13.

Power plant 11 includes a power generator for generating electricity and supplies electric power generated by the power generator to power transmission and distribution facility 12. Power plant 11 may generate electric power in any scheme, which may for example be any one of thermal power generation, hydroelectric power generation, wind power generation, nuclear power generation, and solar photovoltaic power generation. Power transmission and distribution facility 12 includes a power transmission line, a substation, and an electricity distribution line, and transmits and distributes electric power supplied from power plant 11. Power plant 11 and power transmission and distribution facility 12 constitute a power system (a power grid).

Smart meter 13 measures an amount of power usage each time a prescribed time period elapses (for example, each time thirty minutes elapses), stores the measured amount of power usage, and transmits the measured amount of power usage to server 10.

Each entity (hereinafter also referred to as a "parent AG") belonging to upper aggregator E2 manages a plurality of entities (each of which will be hereinafter also referred to as a "child AG") belonging to lower aggregator E3, and brings together the amounts of electric power controlled by children AGs under the jurisdiction so as to provide energy management service. Parent AG can gain profits, for example, by dealing with electric power company E1.

Server 10 manages information about a plurality of parent AGs (for example, parent AGs registered in server 10) under the jurisdiction. Identification information (ID) for identification of a parent AG is provided for each parent AG. Server 10 manages information for each parent AG as being distinguished based on an ID of the parent AG. Upper aggregator E2 includes a plurality of servers (for example, servers 20A to 20C) provided for each parent AG. Each server included in upper aggregator E2 is denoted as a "server 20" except for the case where the servers are described as being distinguished from one another. Although FIG. 1 shows three servers 20 (servers 20A to 20C), upper aggregator E2 may include any number of servers 20, and may include ten or more servers 20.

Each server 20 included in upper aggregator E2 manages information about children AGs (for example, children AGs registered in server 20) under the jurisdiction. Each entity (referred to as a child AG) belonging to lower aggregator E3 controls an amount of electric power by requesting each demand side to level out electric power (that is, to suppress or increase electric power demand) by issuing a demand response signal (DR signal). Identification information (ID) for identification of a child AG is provided for each child AG. Server 20 manages information for each child AG as being distinguished based on an ID of the child AG. Lower aggregator E3 includes a plurality of servers (for example, servers 30A to 30C) provided for each child AG. Each server included in lower aggregator E3 is denoted as a "server 30" except for the case where the servers are described as being distinguished from one another. Servers 30A to 30C shown in FIG. 1 are managed by a common server 20 (for example, server 20B). Each server 20 included in upper aggregator E2 may manage any number of servers 30, and may manage ten or more servers 30.

The demand side managed by child AG (or server 30) in VGI system 1 shown in FIG. 1 is an electric vehicle (EV). The EV can receive electric power supplied from electric vehicle supply equipment (EVSE). In the present embodiment, VGI system 1 includes both an EVSE (for example, a normal charger) conforming to an AC power supply scheme (an AC scheme), and an EVSE (for example, a quick charger) conforming to a DC power supply scheme (a DC scheme). VGI system 1 only has to include at least one of the EVSE in the AC scheme and the EVSE in the DC scheme. Furthermore, in the present embodiment, the EV can supply electric power to the EVSE (that is, a power grid).

In the present embodiment, the EVSE included in VGI system 1 is a home EVSE (that is, an EVSE installed in a residence). Since an EV can be parked in a residence for a long time period, the home EVSE is suitable for energy management. The home EVSE can be managed by a home energy management system-gateway (HEMS-GW).

VGI system 1 includes a plurality of EVSEs, a plurality of EVs, and a plurality of HEMS-GWs (one EVSE, one EV and one HEMS-GW are shown in FIG. 1). The number of EVSEs, the number of EVs and the number of HEMS-GWs included in VGI system 1 may be independently set to be any number, which may be ten or more, or may be one hundred or more. Each EVSE, each EV, and each HEMS-GW included in VGI system 1 are denoted as an "EVSE 40," an "EV 50," and an "HEMS-GW 60," respectively, except for the case where these are described as being distinguished from one another. Each EV 50 included in VGI system 1 may be a vehicle owned by an individual or a vehicle managed by a mobility as a service (MaaS) entity.

Each server 30 included in lower aggregator E3 manages information about a plurality of EVs 50 (for example, EVs registered in server 30) under the jurisdiction. Identification information (hereinafter also referred to as a "vehicle ID") for identification of EV 50 is provided for each EV 50. Server 30 manages information for each EV 50 as being distinguished based on the vehicle ID. Each server 30 included in lower aggregator E3 can communicate with each HEMS-GW 60 (for example, an HEMS-GW registered in server 30) under the jurisdiction, and obtains the state of EVSE 40 (for example, an EVSE registered in server 30) under the jurisdiction from HEMS-GW 60. HEMS-GW 60 receives information (for example, a DR signal described later) from server 30 and transmits the state of EVSE 40 to server 30.

EVSE 40 is connected to the power system of electric power company E1 with smart meter 13 interposed therebetween. The amount of power usage in EVSE 40 (for example, the amount of electric power used for charging the EV) is measured by smart meter 13 and transmitted to server 10. Smart meter 13 is provided for each EVSE 40 included in VGI system 1. Each EVSE 40 included in VGI system 1 is managed by electric power company E1 and receives electric power supplied from electric power company E1. In VGI system 1, identification information for identification of EVSE 40 (hereinafter also referred to as a "facility ID") is provided for each EVSE 40, and server 10 manages the amount of power usage in each EVSE 40 as being distinguished by a facility ID. Furthermore, EVSE 40 supplies the electric power received from EV 50 to a power system (that is, causes a reverse power flow). In such a configuration, in addition to the amount of power usage, the amount of electric power subjected to reverse power flow is measured by smart meter 13.

Figure 2:
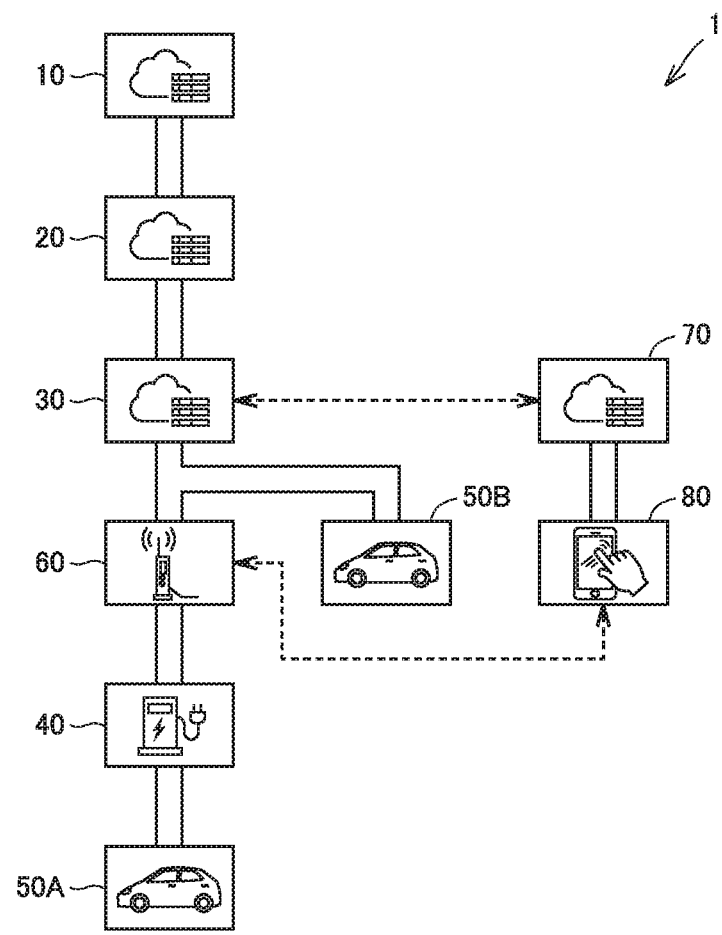
FIG. 2 is a diagram of a communication system of the VGI system.

The following is an explanation about the functions of elements forming VGI system 1 with reference to FIG. 2. FIG. 2 is a diagram of a communication system of VGI system 1. In FIG. 2, each of EV 50A and EV 50B corresponds to an example of EV 50 (FIG. 1) as described above. It should be noted that EV 50A is electrically connected to EVSE 40 through a charging cable while it is parked in a parking space of a residence where EVSE 40 is installed. In this case, EV 50B is traveling.

Referring to FIG. 2, in VGI system 1, server 10 and server 20 can communicate with each other. Server 20 and server 30 can also communicate with each other. The communication scheme between servers 10 and 20 and the communication scheme between servers 20 and 30 may be set independently in any scheme, which may be a virtual private network (VPN), for example.

Server 30 can communicate with each of EV 50B and HEMS-OW 60. Server 30 and HEMS-GW 60 communicate with each other, for example, through the Internet. Server 30 and each EV 50 (that is, EV 50A and EV 50B) wirelessly communicate with each other, for example, through a mobile communication network (telematics).

HEMS-GW 60 and EVSE 40 communicate with each other, for example, through a local area network (LAN). The LAN may be a wired or wireless LAN. EVSE 40 and EV 50A communicate with each other, for example, through a charging cable. EVSE 40 and EV 50A may communicate with each other in any communication scheme, which may be a controller area network (CAN) or a power line communication (PLC).

VGI system 1 further includes a data center 70 and a portable terminal 80 registered in data center 70. Data center 70 includes, for example, a server (not shown) that manages information. In the present embodiment, a smartphone equipped with a touch panel display is adopted as portable terminal 80. Without being limited thereto, any portable terminal can be adopted as portable terminal 80. For example, a wearable device such as a smart watch can also be adopted.

Data center 70 communicates with server 30, for example, through the Internet. Data center 70 manages information about a plurality of registered portable terminals 80. Information about portable terminal 80 includes not only information about the terminal itself (for example, a communication address of portable terminal 80) but also information about a user who owns portable terminal 80 (for example, a vehicle ID of EV 50 belonging to the user). Identification information for identification of portable terminal 80 (hereinafter also referred to as a "terminal ID") is provided for each portable terminal 80. Data center 70 manages information for each portable terminal 80 as being distinguished based on the terminal D. The terminal ID also functions as information for identification of a user (a user ID). Although FIG. 2 shows only a single portable terminal 80, portable terminal 80 is owned by each user.

Prescribed application software (hereinafter simply referred to as an "application") is installed in portable terminal 80. Portable terminal 80 exchanges information with each of HEMS-GW 60 and data center 70 through the application. Portable terminal 80 wirelessly communicates with each of HEMS-GW 60 and data center 70, for example, through the Internet.

Server 10 adjusts the balance between demand and supply of electric power by using a demand response (DR). When server 10 adjusts such the balance, it first transmits a DR signal to each server 20 (for example, servers 20A to 20C shown in FIG. 1) included in upper aggregator E2. The DR signal is for requesting each server 20 to participate in DR (hereinafter also referred to as a "DR request"). The DR request includes a region as a target of DR, a type of DR (for example, demand-suppressing DR or demand-increasing DR), and a DR period.

When server 20 receives a DR request from server 10, it calculates a possible DR amount (that is, an amount of electric power that can be adjusted according to DR) and transmits the calculated amount to server 10. Server 20 can calculate the possible DR amount, for example, based on a total sum of DR capacities of children AGs under the jurisdiction (that is, a capacity that can address DR). Server 20 can obtain the DR capacity of each child AG under the jurisdiction, for example, by making an inquiry to server 30. Server 10 determines a DR amount for each parent AG (that is, a power adjustment amount for which a parent AG is requested) based on the possible DR amount received from each server 20 included in upper aggregator E2, and then, transmits a signal indicating execution of DR (hereinafter also referred to as a "first DR execution instruction") to server 20 of each parent AG. The first DR execution instruction includes a region as a target of DR, a type of DR (for example, demand-suppressing DR or demand-increasing DR), an amount of DR for each parent AG, and a DR period.

Server 30 sequentially obtains, from each EV 50, information showing the state of each EV 50 (for example, a position of a vehicle, a remaining amount in a battery, a travel schedule, the number of times of turning on and off a relay at the time of DR, and a travel condition) under the jurisdiction, and saves the information. As a result of accumulation of such data, histories of charging and discharging of each EV 50 under the jurisdiction, a history of travel of each EV 50 under the jurisdiction, and the number of times of turning on and off the relay at the time of DR are saved in server 30. Server 30 sequentially obtains, from each HEMS-GW 60 connected to each EVSE 40, information showing the state of each EVSE 40 (for example, information showing whether or not the vehicle is being charged, a schedule for charging, a condition for charging, information showing whether or not the vehicle is being discharged, a schedule for discharging, and a condition for discharging) under the jurisdiction, and saves the information. As a result of accumulation of such data, histories of charging and discharging of each EVSE 40 under the jurisdiction are saved in server 30.

By operating portable terminal 80, the user can transmit information showing the state of the user (for example, information showing whether the user can address DR or not) to data center 70. Data center 70 saves the information received from portable terminal 80 as being distinguished for each terminal ID. Server 30 can obtain information about the user from data center 70.

When server 30 receives the previously-described inquiry from server 20, server 30 calculates the DR capacity of a child AG corresponding to this server 30 based on the information about each of EV 50, EVSE 40, and the user described above, and transmits the DR capacity to server 20. When server 20 receives the above-mentioned first DR execution instruction from server 10, server 20 determines a DR amount for each child AG (that is, an amount of electric power that the child AG is requested to adjust) based on the DR capacity received from each server 30 included in lower aggregator E3, and then transmits a signal instructing server 30 of each child AG to execute DR (hereinafter also referred to as a "second DR execution instruction"). The second DR execution instruction includes a region as a target of DR, a type of DR (for example, demand-suppressing DR or demand-increasing DR), an amount of DR for each child AG, and a DR period.

When server 30 receives the second DR execution instruction, it allocates the DR amount to each EV 50 that can address DR among EVs 50 under the jurisdiction, generates a DR signal for each EV 50, and transmits the DR signal to each EV 50. The DR signal includes a type of DR (for example, demand-suppressing DR or demand-increasing DR), an amount of DR for each EV 50, and a DR period.

Figure 3:
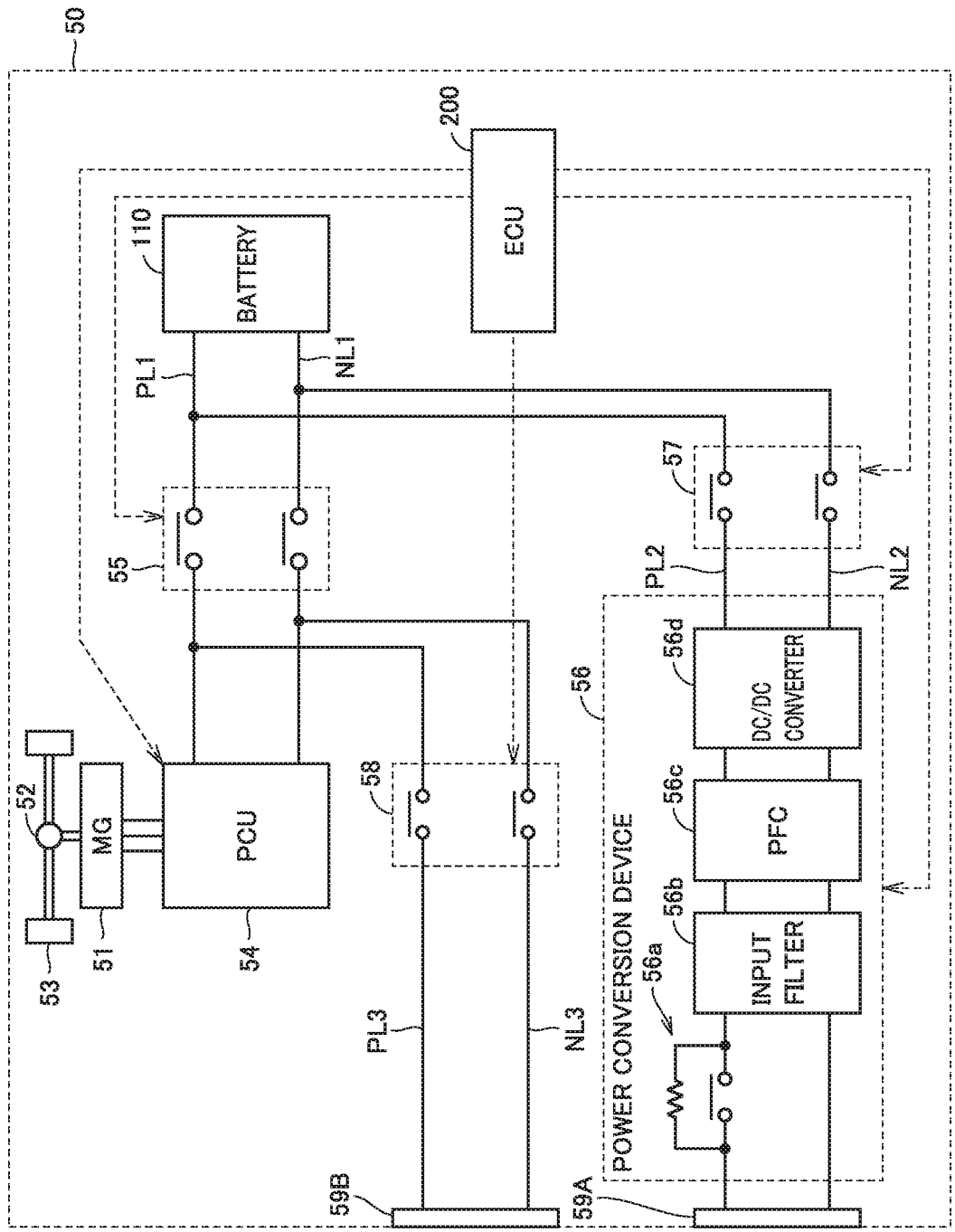
FIG. 3 is a diagram showing an example of the configuration of an EV.

FIG. 3 is a diagram showing an example of the configuration of EV 50. Referring to FIG. 3, EV 50 includes a motor generator (MG) 51, a power transmission gear 52, a driving wheel 53, a power control unit (PCU) 54, a system main relay (SMR) 55, an AC relay 57, a DC relay 58, a power conversion device 56, an AC inlet 59A, a DC inlet 59B, a battery 110, and an electronic control unit (ECU) 200. ECU 200 controls charging and discharging of EV 50.

Battery 110 stores electric power for traveling. Battery 110 includes, for example, a secondary battery such as a lithium ion battery or a nickel-metal hydride battery. The secondary battery may be a cell or a battery assembly. Instead of the secondary battery, another power storage such as an electric double layer capacitor may be adopted.

Battery 110 and PCU 54 are connected by power supply lines PL1 and NL1. SMR 55 is provided in the middle of each of power supply lines PL1 and NL1. One end of power supply line PL2 is connected at a position between SMR 55 and battery 110 on power supply line PL1. Also, one end of power supply line NL2 is connected at a position between SMR 55 and battery 110 on power supply line NL1. The other ends of power supply lines PL2 and NL2 are connected to power conversion device 56. AC relay 57 is provided between the one end and the other end of power supply line PL2 and between the one end and the other end of power supply line NL2.

AC relay 57 can be switched between a connected state (closed state) and a disconnected state (opened state) from one to the other between power conversion device 56 and battery 110. AC relay 57 operates in response to the control signal from ECU 200, for example. AC relay 57 is controlled to be in a connected state, for example, when execution of charging control or discharging control using power conversion device 56 is requested.

AC inlet 59A can transmit and receive AC power between the power grid external to EV 50 and battery 110. Power conversion device 56 is located between AC inlet 59A and battery 110. Power conversion device 56 converts the AC power received by AC inlet 59A from the power grid into DC power, and supplies the converted DC power to battery 110. Furthermore, power conversion device 56 converts the DC power of battery 110 into AC power, and supplies the converted AC power to the power grid through AC inlet 59A.

Power conversion device 56 includes a pre-charge relay 56a, an input filter 56b, a power factor correction (PFC) 56c, and a DC/DC converter 56d.

Pre-charge relay 56a serves to prevent a rush current from occurring when AC relay 57 is turned on. Pre-charge relay 56a operates in response to a control signal from ECU 200. Pre-charge relay 56a is controlled to be turned on after a current flows through a resistance element connected in parallel with a relay circuit of pre-charge relay 56a, for example, in a time period from the time when AC relay 57 is controlled to be turned on to the time when a predetermined pre-charge time period elapses.

As AC relay 57 is turned on, AC power supplied from AC inlet 59A can be converted into DC power through input filter 56b and PFC 56c. Alternatively, as AC relay 57 is turned on, DC power supplied from battery 110 can be converted into AC power through input filter 56b and PFC 56c.

DC/DC converter 56d includes a semiconductor switching element (not shown) and transforms the voltage of the DC power (that is, raise or lower the voltage) by the semiconductor switching element. Furthermore, DC/DC converter 56d is capable of switching connection/disconnection of the electric power path by the above-mentioned semiconductor switching element. DC/DC converter 56d is controlled by ECU 200.

It should be noted that the configuration of power conversion device 56 is not limited to the above configuration but may be modified as appropriate. Power conversion device 56 may include, for example, at least one of an insulating circuit (for example, an insulating transformer) and an inverter (for example, an inverter that converts electric power by a semiconductor switching element).

One end of power supply line PL3 is connected at a position between SMR 55 and PCU 54 on power supply line PL1. One end of power supply line NL3 is connected at a position between SMR 55 and PCU 54 on power supply line NL1. The other ends of power supply lines PL3 and NL3 each are connected to DC inlet 59B. DC inlet 59B receives DC power supplied from the outside of EV 50. DC relay 58 is provided between the one end and the other end of power supply line PL3 and between the one end and the other end of power supply line NL3.

DC relay 58 can be switched between the connected state (closed state) and the disconnected states (opened state) from one to the other between DC inlet 59B and each of one ends of power supply lines PL3 and NL3. DC relay 58 operates in response to the control signal from ECU 200, for example. DC relay 58 is controlled to be in a connected state when transmission and reception of electric power between the power grid and EV 50 through. DC inlet 59B is requested.

SMR 55 is provided in power supply lines PL1 and NL1 that connect battery 110 and PCU 54. The state of SMR 55 (connection/disconnection) is controlled by ECU 200. When SMR 55 is in the connected state (the closed state), electric power can be transmitted and received between battery 110 and PCU 54. When. SMR 55 is in the disconnected state (the opened state), electric power cannot be transmitted and received between battery 110 and PCU 54. SMR 55 is controlled to be in the connected state while the vehicle is traveling. Furthermore, when transmission and reception of electric power between the power grid and EV 50 through DC inlet 59B is requested, SMR 55 is controlled to be in the connected state together with DC relay 58.

MG51 is a three-phase AC motor generator, for example. MG 51 is driven by PCU 54 to rotate driving wheel 53. PCU 54 includes, for example, a controller including a processor, an inverter, and a converter (none of which is shown). The controller of PCU 54 receives an instruction (a control signal) from ECU 200 and controls the inverter and the converter of PCU 54 according to the instruction. The output torque of MG51 is transmitted to driving wheel 53 through power transmission gear 52 that serves as a speed reducer. MG 51 generates traveling drive force for EV 50 using the electric power supplied from battery 110 through the inverter and the converter of PCU 54. Furthermore, MG 51 performs regenerative power generation and supplies the generated electric power to battery 110. EV 50 may be driven in any driving system, which may be a front-wheel driving system or a four-wheel driving system, for example. FIG. 3 shows a configuration in which only one MG is provided, but the number of MGs is not limited thereto, and a plurality of (for example, two) MGs may be provided.

The state (for example, a temperature, a current, and a voltage) of battery 110 is detected, for example, by various types of sensors (none of which is shown). The detection results are output to ECU 200. By using the detection results from various sensors, ECU 200 can obtain the state (for example, a temperature, a current, a voltage, a state of charge (SOC), and an internal resistance) of battery 110.

Figure 4:
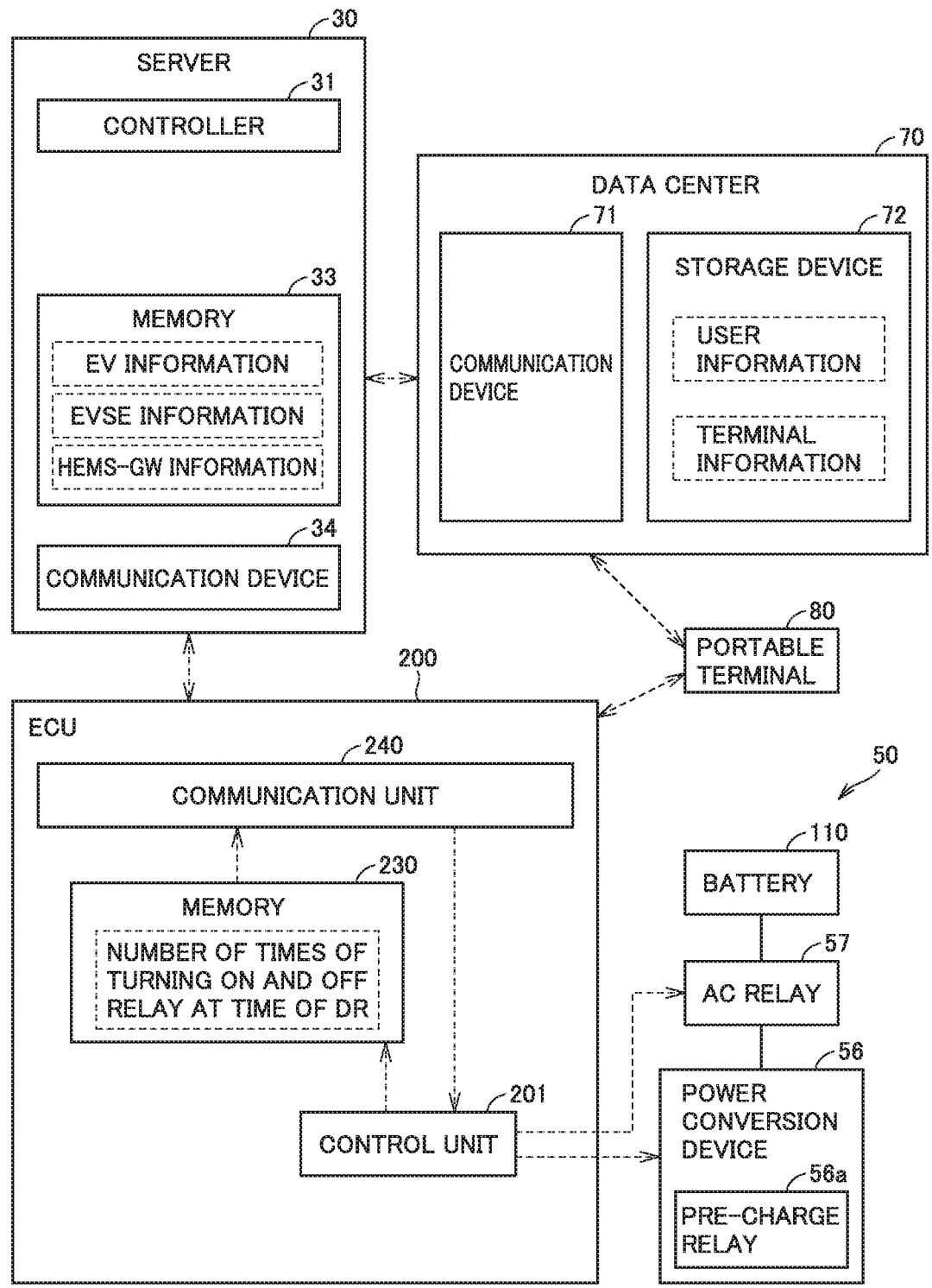
FIG. 4 is a diagram showing components in a server and an ECU.

ECU 200 includes a central processing unit (CPU), a memory (see FIG. 4), and a communication unit (see FIG. 4). The memory includes a read only memory (ROM), a random access memory (RAM), and a rewritable nonvolatile memory. The CPU executes the program stored in the memory (for example, ROM), thereby performing various types of control. Based on signals received from various sensors, and a map, a mathematical expression and various parameters and programs stored in the memory, ECU 200 controls each component to bring vehicle EV 50 into a desired state. Various types of control performed by ECU 200 are not limited to processing by software, but may be processed by dedicated hardware (an electronic circuit). The communication unit can communicate with each of server 30, EVSE 40 and portable terminal 80. Furthermore, the communication unit may be able to communicate with each of HEMS-OW 60 and data center 70. In the description of the present embodiment, one ECU 200 performs various types of control, but a plurality of ECUs may be set for each type of control, for example.

In VGI system 1 having the configuration as described above, for example, in the case where participation in DR is requested by server 30 (FIG. 2) when EV 50A is connected to EVSE 40 so as to allow power transmission and reception therebetween, charging is started and stopped or discharging is started and stopped, thereby allowing contribution to adjustment of the amount of power demand.

However, when the relay mounted in EV 50 is switched to a closed state or an opened state each time charging or discharging of battery 110 is started and stopped at the time of participation in DR, the number of times of the relay operation may increase. As a result, the lifetime of the relay may be shortened. Furthermore, in order not to increase the number of times of the relay operation, it is also conceivable to stop the relay operation, which may however prevent required power transmission and reception.

Thus, in the present embodiment, server 30 obtains, from EV 50, the number of switching times that is the number of times of performing a switching operation for switching the state of the relay between the opened state and the closed state from one to the other. Then, when the obtained number of switching times exceeds a threshold value, server 30 prohibits the switching operation corresponding to the transaction for electric power.

In this way, when the number of switching times exceeds the threshold value, the switching operation corresponding to the transaction for electric power is prohibited. Thereby, an increase in the number of switching times of the relay can be suppressed. Thus, shortening of the lifetime of the relay can be suppressed. Furthermore, since the switching operation not corresponding to the transaction for electric power is not prohibited, required power transmission and reception can be performed. In the present embodiment, server 30 corresponds to a "vehicle management apparatus". Also, in the present embodiment, the switching operation according to the DR request in the power grid will be described below as an example of the switching operation corresponding to the transaction for electric power.

FIG. 4 is a diagram showing components in server 30 and ECU 200 according to functions. Referring to FIG. 4, ECU 200 includes a control unit 201, a memory 230, and a communication unit 240. Control unit 201 is implemented, for example, by a CPU executing a program without limitation, and may be implemented by dedicated hardware (an electronic circuit).

Control unit 201 controls AC relay 57 to be brought into a closed state and controls pre-charge relay 56*a* of power conversion device 56 to be brought into an opened state, AC relay 57 is in the closed state and pre-charge relay 56*a* of power conversion device 56 is in the opened state, thereby allowing transmission and reception of electric power between battery 110 and the power grid.

For example, when a power demand increase is requested by a DR signal from server 30 through communication unit 240 (that is, demand-increasing DR), and when AC relay 57 is the opened state, control unit 201 performs a switching operation to bring each of AC relay 57 and pre-charge relay 56a into a closed state. Then, control unit 201 executes charging control of battery 110.

Alternatively, for example, when a power demand suppression (that is, demand-suppressing DR) is requested by a DR signal from server 30 through communication unit 240 and when battery 110 is being charged (that is, AC relay 57 is in the closed state), control unit 201 stops charging of battery 110. Then, control unit 201 performs a switching operation so as to bring each of AC relay 57 and pre-charge relay 56a into an opened state.

Each time control unit 201 receives a DR signal and switches each of AC relay 57 and pre-charge relay 56a between the opened state and the closed state from one to the other, control unit 201 increments, by one, the value showing the number of times of turning on and off the relay at the time of DR, which is stored in a prescribed storage area of memory 230.

In the present embodiment, the "number of times of turning on and off the relay at the time of DR" shows the larger one of: the number of times of performing a switching operation at the time of DR for AC relay 57 (the number of switching times), and the number of switching times at the time of DR for pre-charge relay 56a. Also, the "number of times of turning on and off the relay at the time of DR" may for example be one of: the number of times of performing a switching operation at the time of DR for AC relay 57; and the number of times of performing a switching operation at the time of DR for pre-charge relay 56a. The "number of times of turning on and off the relay at the time of DR" may for example be the smaller one of the upper limit values of the above-mentioned numbers of switching times.

Figure 5:
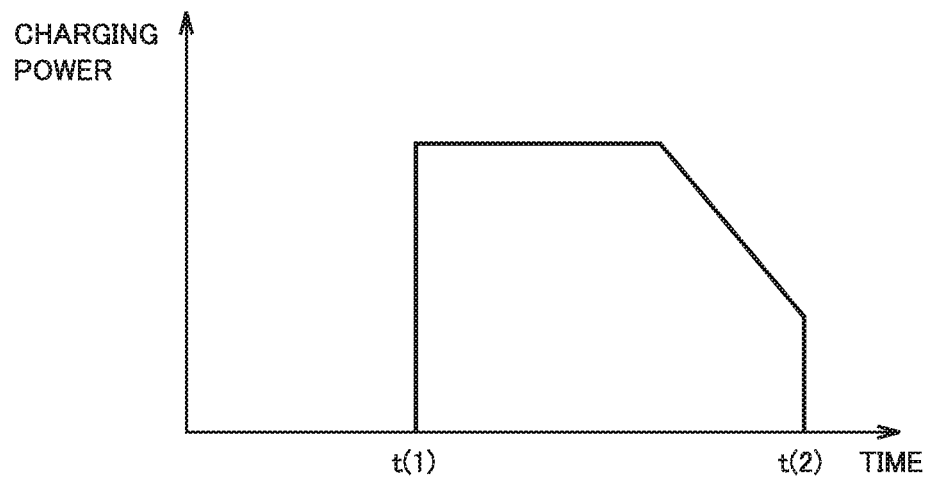
FIG. 5 is a diagram for illustrating an example of a change in the number of times of turning on and off a relay at the time of DR.

FIG. 5 is a diagram for illustrating an example of a change in the number of times of turning on and off the relay at the time of DR. In FIG. 5, the horizontal axis shows time while the vertical axis shows charging power. For example, the following is an explanation about the case where demand-increasing DR is requested by a DR signal, to thereby continuously charge battery 110 of EV 50 until a prescribed time period elapses.

As shown in FIG. 5, at time t(1), each of AC relay 57 and pre-charge relay 56a is switched from the opened state to the closed state, and power conversion device 56 is operated to thereby output charging power to battery 110. At this time, the value showing the number of times of turning on and off the relay at the time of DR is incremented by one. Then, at time t(2), when the request of demand-increasing DR is accomplished, charging of battery 110 is stopped. Then, each of AC relay 57 and pre-charge relay 56a is switched from the closed state to the opened state. At this time, the value showing the number of times of turning on and off the relay at the time of DR is further incremented by one. As a result, the value showing the number of times of turning on and off the relay at the time of DR is incremented by two in a time period from the time when the demand-increasing DR is requested to the time when time t(2) passes.

Figure 6:
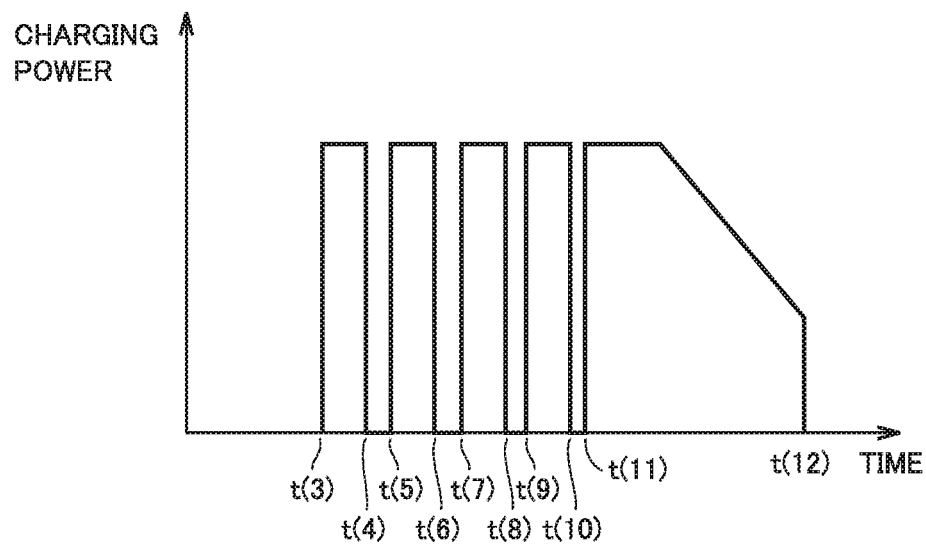
FIG. 6 is a diagram for illustrating another example of a change in the number of times of turning on and off the relay at the time of DR.

FIG. 6 is a diagram for illustrating another example of a change in the number of times of turning on and off the relay at the time of DR. In FIG. 6, the horizontal axis shows time while the vertical axis shows charging power. For example, the following is an explanation about the case where demand-increasing DR is requested by a DR signal, to thereby intermittently charge battery 110 of EV 50 until a prescribed time period elapses.

As shown in FIG. 6, at each of time t(3), time t(5), time t(7), time t(9), and time t(11), each of AC relay 57 and pre-charge relay 56a is switched from the opened state to the closed state, and power conversion device 56 is operated to thereby output charging power to battery 110. At this time, the value showing the number of times of turning on and off the relay at the time of DR at each time is incremented by one.

Furthermore, at each of time t(4), time t(6), time t(8), time t(10), and time t(12), charging of battery 110 is stopped, and each of AC relay 57 and pre-charge relay 56a is switched from the closed state to the opened state. At this time, the value showing the number of times of turning on and off the relay at the time of DR at each time is incremented by one. As a result, the number of times of turning on and off the relay is incremented by one at each time. Consequently, the value showing the number of times of turning on and off the relay at the time of DR is incremented by ten in a time period from the time when demand-increasing DR is requested to the time when time t(12) passes. In this way, each increment amount of the number of times of turning on and off the relay at the time of DR for one DR signal may vary also depending on whether charging and discharging are performed continuously or intermittently.

Furthermore, for example, when control unit 201 receives a reset request for the number of times of turning on and off the relay at the time of DR from server 30 through communication unit 240, control unit 201 resets the number of times of turning on and off the relay at the time of DR to an initial value (for example, zero).

For example, when communication unit 240 receives, from server 30, a request to transmit the number of times of turning on and off the relay at the time of DR, it transmits, to server 30, the information showing the number of times of turning on and off the relay at the time of DR, which is stored in memory 230, together with a vehicle ID.

Server 30 includes a controller 31, a memory 33, and a communication device 34. Memory 33 stores: information about EV 50 registered in server 30 (EV information); information about EVSE 40 (see FIG. 2) (EVSE information); and information about HEMS-GW 60 (see FIG. 2) (HEMS-GW information). In memory 33, the information about EV 50 is associated with a vehicle ID, and the information about EVSE 40 is associated with a facility ID. It should be noted that the information about EV 50 includes information about the number of times of turning on and off the relay at the time of DR as described above.

Communication device 34 can communicate with each of HEMS-GW 60, data center 70 and ECU 200. Furthermore, communication device 34 can communicate, directly or through data center 70, with portable terminal 80.

Data center 70 includes a communication device 71 and a storage device 72. Communication device 71 can communicate with each of server 30, HEMS-GW 60 and portable terminal 80. Communication device 71 may also be able to communicate with ECU 200. Communication device 71 stores the data received from outside in storage device 72 and transmits the data read from storage device 72 to outside. In storage device 72, information about each of portable terminal 80 and the user registered in server 30 is stored in association with a terminal ID.

In VGI system 1 shown in FIG. 1, when electric power company E1 needs to reduce the electric power demand, it transmits a DR request to request participation in demand-suppressing DR from server 10 to each server 20. In general, the amount of power demand increases during daytime and decreases during midnight. Electric power company E1 requests upper aggregator E2 to participate in demand-suppressing DR in a time period during daytime, so as to reduce the amount of power demand during daytime, thereby allowing levelling out of the power demand load.

Again referring to FIG. 1, when a DR request to request participation in demand-suppressing DR is given from server 10 to each server 20, each server 20 sends a possible DR amount back to server 10. Server 10 that has received the possible DR amount determines a parent AG that participates in demand-suppressing DR, and then, transmits the first DR execution instruction to server 20 of each parent AG that participates in demand-suppressing DR. Each server 20 that has received the first DR execution instruction determines a child AG that participates in demand-suppressing DR, and then, transmits the second DR execution instruction to server 30 of each child AG that participates in demand-suppressing DR. Each server 30 that has received the second DR execution instruction determines EV 50 that participates in demand-suppressing DR, and then, transmits a demand-suppressing DR signal to each EV 50 that participates in demand-suppressing DR.

At this time, when server 30 receives the second DR execution instruction from server 20, it excludes a vehicle (EV) that cannot participate in DR from the list of EVs 50 (hereinafter referred to as a vehicle list) associated with the users who express their intentions of participating in DR. Then, server 30 performs a process of allocating a DR amount to each vehicle that can participate in DR (which may be hereinafter also referred to as an allocation process).

Figure 7:
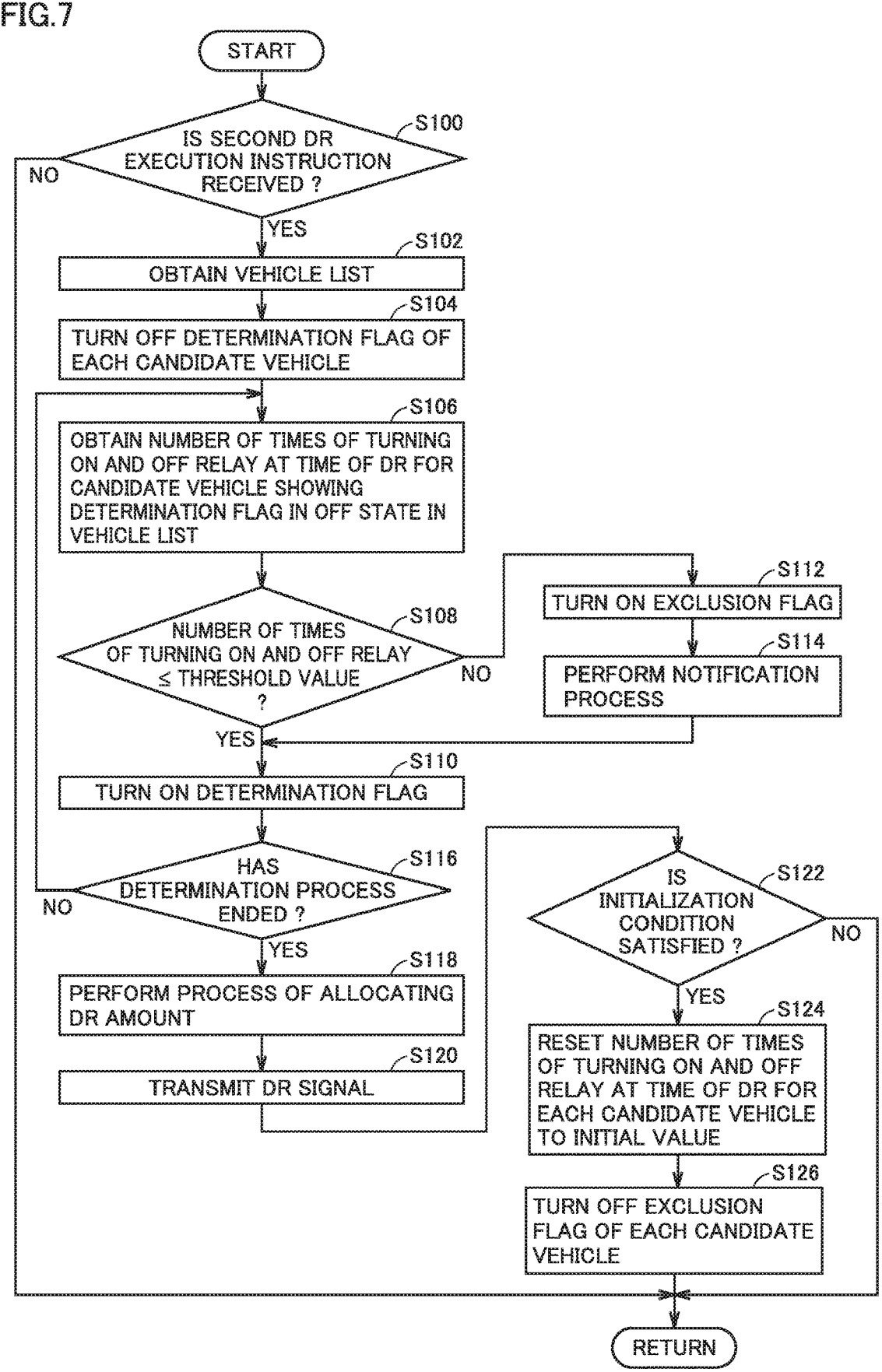
FIG. 7 is a flowchart illustrating an example of a process performed in the server.

The following is an explanation about an example of the control process performed in server 30 with reference to FIG. 7. FIG. 7 is a flowchart illustrating an example of the process performed in server 30.

In step (hereinafter abbreviated as S) 100, server 30 determines whether the second DR execution instruction is received or not. When server 30 determines that the second DR execution instruction is received (YES in S100), the process proceeds to S102.

In S102, server 30 obtains a vehicle list showing a candidate vehicle to which DR can be allocated.

FIG. 8 is a diagram showing the configuration of an example of the vehicle list. As shown in FIG. 8, the vehicle list includes a vehicle ID, a DR amount, the number of times of turning on and off a relay at the time of DR, a determination flag, and an exclusion flag, for example.

The vehicle ID shows a vehicle ID of the candidate vehicle that is set, for example, by the user as a vehicle that can address DR.

The DR amount shows the amount of DR allocated to each candidate vehicle in the allocation process described later. The DR amount is registered or updated when the allocation process is performed.

The determination flag is a flag showing that the determination process has already been performed, which is to determine whether or not the number of times of turning on and off the relay at the time of DR (described later) is equal to or less than a threshold value.

The exclusion flag is a flag showing that a vehicle of interest is excluded from the candidates to which the DR amount is allocated in the allocation process.

The vehicle list in FIG. 8 shows a candidate vehicle of a vehicle ID "001" in which the DR amount is "a", the number of times of turning on and off the relay at the time of DR is "Ca", the determination flag is in an ON state, and the exclusion flag is in an OFF state, by way of example.

Furthermore, the vehicle list in FIG. 8 shows a candidate vehicle of a vehicle ID "002" in which the DR amount is "b", the number of times of turning on and off the relay at the time of DR is "Cb", the determination flag is in an ON state, and the exclusion flag is in an OFF state, by way of example.

Furthermore, the vehicle list in FIG. 8 shows a candidate vehicle of a vehicle ID "003" in which the DR amount is "c", the number of times of turning on and off the relay at the time of DR is "Cc", the determination flag is in an ON state, and the exclusion flag is in an OFF state, by way of example.

Furthermore, the vehicle list in FIG. 8 shows a candidate vehicle of a vehicle ID "004" in which the DR amount is "d", the number of times of turning on and off the relay at the time of DR is "Cd", and each of the determination flag and the exclusion flag is in an OFF state, by way of example.

Server 30 may update the vehicle ID registered in the vehicle list by using the vehicle ID of the EV owned by the user, which is set as being capable of addressing DR and stored in data center 70, for example, each time a predetermined list update time period elapses.

It should be noted that the information registered in the vehicle list is not limited to the information shown in FIG. 8, but may include not only the information shown in FIG. 8 but also the information about other vehicles and the like.

Referring back to FIG. 7, in S104, server 30 updates the determination flag of each candidate vehicle in the vehicle list to be in an OFF state.

In S106, server 30 obtains the number of times of turning on and off the relay at the time of DR for one of the candidate vehicles (EV) each showing the determination flag in an OFF state in the vehicle list. Server 30 specifies, for example, the vehicle ID of one of the candidate vehicles each showing the determination flag in an OFF state in the vehicle lists shown in FIG. 6. Then, to the candidate vehicle having the specified vehicle ID, server 30 transmits a request to transmit the number of times of turning on and off the relay at the time of DR. Server 30 transmits a request to transmit the number of times of turning on and off the relay at the time of DR, for example, to a candidate vehicle having a smaller vehicle ID among the candidate vehicles each showing the determination flag in an OFF state. The candidate vehicle having received the transmission request reads the number of times of turning on and off the relay at the time of DR that is stored in memory 230, and then, transmits it to server 30. Thereby, server 30 obtains the number of times of turning on and off the relay at the time of DR for the specified vehicle ID.

In S108, server 30 determines whether or not the obtained number of times of turning on and off the relay at the time of DR is equal to or less than a threshold value. The threshold value is a predetermined value, for example, and is adapted by experiment and the like. When it is determined that the number of times of turning on and off the relay at the time of DR is equal to or less than the threshold value (YES in S108), the process proceeds to S110.

In S110, server 30 turns on the determination flag. Specifically, server 30 turns on the determination flag that corresponds to the candidate vehicle, in the vehicle list, as a target of determination about the number of times of turning on and off the relay at the time of DR.

On the other hand, when it is determined that the obtained number of times of turning on and off the relay at the time of DR is greater than the threshold value (NO in S108), the process proceeds to S112.

In S112, server 30 turns on the exclusion flag. Specifically, server 30 turns on the exclusion flag that corresponds to the candidate vehicle, in the vehicle list, as a target of determination about the number of times of turning on and off the relay at the time of DR.

In S114, server 30 performs a notification process. Specifically, server 30 notifies the user of the candidate vehicle that participation in DR is prohibited because the number of times of turning on and off the relay at the time of DR exceeds the threshold value. Server 30 specifies the user ID of the candidate vehicle based on the vehicle ID of the candidate vehicle and the information stored in data center 70. Then, to portable terminal 80 corresponding to the specified user ID, server 30 transmits the notification information showing that participation in DR is prohibited because the number of times of turning on and off the relay at the time of DR exceeds the threshold value. The transmitted notification information is displayed on a display or the like in portable terminal 80, thereby notifying the user about the notification information. Server 30 then proceeds the process to S110.

In S116, server 30 determines whether the determination process has ended or not. Specifically, when each of the determination flags of the candidate vehicles registered in the vehicle list is in an ON state, server 30 determines that the determination process has ended. When it is determined that the determination process has ended (YES in S116), the process proceeds to S118. When it is determined that the determination process has not ended (NO in S116), the process proceeds to S106.

In S118, server 30 performs the process of allocating a DR amount. Specifically, server 30 allocates the DR amount included in the second DR execution instruction, for example, to the candidate vehicle showing the exclusion flag in an OFF state in the vehicle list.

Server 30 may, for example, divide the DR amount included in the second DR execution instruction by the number of vehicles each showing the exclusion flag in an OFF state among the candidate vehicles registered in the vehicle list, to thereby allocate an equal DR amount to the candidate vehicles.

Alternatively, the DR amount may be allocated to each candidate vehicle as follows. Specifically, server 30 calculates an initial DR amount that is allocated to each candidate vehicle when each candidate vehicle showing the exclusion flag in an ON state is in an OFF state. Server 30 divides the initial DR amount of the candidate vehicle showing the exclusion flag in an ON state by the number of candidate vehicles each showing the exclusion flag in an OFF state. Server 30 may add the divided value to the initial DR amount of each candidate vehicle showing the exclusion flag in an OFF state, to thereby allocate the DR amount to each candidate vehicle.

In S120, server 30 transmits a DR signal to each candidate vehicle showing the exclusion flag in an OFF state.

In S122, server 30 determines whether an initialization condition is satisfied or not. The initialization condition includes a condition for setting the number of times of turning on and off the relay at the time of DR back to an initial value (for example, zero). The initialization condition includes a condition that the date has changed, for example. For example, server 30 obtains the present date using a clock circuit and the like, and compares the obtained present date with the date (hereinafter referred to as a previous date) obtained as a present date in the determination as to whether the previous initialization condition has been satisfied or not. When the present date is different from the previous date, server 30 determines that the date has changed. When it is determined that the initialization condition is satisfied (YES in S122), the process proceeds to S124.

In S124, server 30 resets the number of times of turning on and off the relay at the time of DR for each candidate vehicle to an initial value (for example, zero). Server 30 transmits, for example, to each candidate vehicle, a reset request to reset the number of times of turning on and off the relay at the time of DR to an initial value. In S126, server 30 turns off the exclusion flag of each candidate vehicle in the vehicle list. When it is determined that the initialization condition is not satisfied (NO in S122), this process is ended.

The operation of server 30 in VGI system 1 having the configuration as described above will be described with reference to FIG. 9.

FIG. 9 is a diagram for illustrating changes in the vehicle list. The upper stage in FIG. 9 shows an example of the vehicle list at a point of time after execution of the process of allocating a DR amount. The lower stage in FIG. 9 shows an example of the vehicle list after a point of time and also after a DR request is received a plurality of times. The configuration of the vehicle list in each of the upper stage and the lower stage in FIG. 9 is the same as the configuration of the vehicle list in FIG. 8 except that the values showing some items are different. Thus, the detailed description thereof will not be repeated except for the point described below.

When the second DR execution instruction is received from server 20 (YES in S100), the vehicle list is obtained (S102).

The determination flag of each candidate vehicle is turned off (S104), and the number of times of turning on and off the relay at the time of DR for the candidate vehicle as a determination target among the candidate vehicles each showing the determination flag in an OFF state is obtained (S106). When the number of times of turning on and off the relay at the time of DR is equal to or less than a threshold value (YES in S108), the determination flag of the candidate vehicle as a determination target is switched from the OFF state to the ON state (S110). If there are any other vehicles each showing the determination flag in an OFF state, it is determined that the determination process does not end (NO in S116). Then, for any one of the candidate vehicles each showing the determination flag in an OFF state, the determination process is performed to determine whether or not the number of times of turning on and off the relay at the time of DR is equal to or less than the threshold value.

Then, when the determination flag of each candidate vehicle is turned on, it is determined that the determination process has ended (YES in S116), and the process of allocating a DR amount is performed (S118).

When there is no vehicle showing the exclusion flag in an ON state, the process of allocating a DR amount is performed to thereby allocate "a", "b", "c", and "d" as DR amounts to the respective candidate vehicles (vehicle IDs "001" to "004") registered in the vehicle list, as shown in the vehicle list on the upper stage in FIG. 9. Then, the DR signal based on the allocated DR amount is transmitted to each candidate vehicle (S120).

When the same date as the date obtained on the previous initialization condition is obtained, it is determined that the initialization condition is not satisfied (NO in S122). Thus, a standby state continues until the next second DR execution instruction is received.

The following is an explanation about the case where a plurality of DR requests are received by repeatedly performing the action in response to the second DR execution instruction as described above. In this case, when the second DR execution instruction is received from server 20 (YES in S100), the vehicle list is obtained (S102).

The determination flag of each candidate vehicle is turned off (S104), and the number of times of turning on and off the relay at the time of DR for the candidate vehicle as a determination target among the candidate vehicles each showing a determination flag in an OFF state is obtained (S106). At this time, the vehicle having a vehicle ID "002" is a determination target, for example. The number of times of turning on and off the relay at the time of DR (Cb') is obtained. Then, when the obtained number of times of turning on and off (Cb') exceeds a threshold value (NO in S108), the exclusion flag corresponding to the vehicle ID "002" is turned on (S112), and the notification process is performed (S114). Then, the determination flag corresponding to the vehicle ID "002" is turned on (S110).

When the determination flag of each candidate vehicle is turned on, it is determined that the determination process has ended (YES in S116). Then, the process of allocating a DR amount is performed (S118).

The exclusion flag corresponding to the vehicle ID "002" is in an ON state. Accordingly, in the process of allocating the DR amount, a', b', and d' are allocated as DR amounts to the respective candidate vehicles (vehicles "001", "003", and "004", respectively) except for the candidate vehicle having a vehicle ID "002" among the candidate vehicles registered in the vehicle list, as shown in the vehicle list on the lower stage in FIG. 9. Then, the DR signal based on the allocated DR amount is transmitted to each candidate vehicle (S120).

When the date different from the date obtained on the previous initialization condition is obtained, it is determined that the initialization condition is satisfied (YES in S122). Thus, a reset request to reset the number of times of turning on and off the relay at the time of DR for each candidate vehicle to an initial value (zero) is transmitted to each candidate vehicle. Then, the exclusion flag of each candidate vehicle is turned off (S126).

As described above, according to the vehicle management apparatus in the present embodiment, when the number of times of turning on and off the relay at the time of DR exceeds a threshold value, the exclusion flag is turned on, thereby prohibiting the relay switching operation according to the DR request. Thereby, an increase in the number of switching times of the relay can be suppressed. Thus, shortening of the lifetime of the relay can be suppressed. Furthermore, since the switching operation not according to the DR request is not prohibited (that is, the switching operation is permitted), required power transmission and reception can be performed. Therefore, a, vehicle management apparatus, a vehicle, and a vehicle management method can be provided, which allows required power transmission and reception while suppressing shortening of the lifetime of the relay.

Furthermore, the numbers of times of turning on and off the relay at the time of DR are summed until the initialization condition is satisfied. Then, when the summed number of times of turning on and off the relay at the time of DR exceeds a threshold value, the relay switching operation according to the DR request is prohibited. When the initialization condition is satisfied, the number of switching times is reset to an initial value. This can suppress an increase in the number of switching times of the relay according to the DR request in a time period until the initialization condition is satisfied.

Furthermore, when the relay switching operation according to the DR request is prohibited, the user of the vehicle is notified that the number of switching times exceeds the threshold value. Thus, the user of the vehicle can recognize that the relay switching operation according to the DR request is prohibited because the number of switching times exceeds the threshold value.

The following is an explanation about a modification.

In the description in the above embodiment, EV 50 has: a configuration that allows charging of battery 110 provided in EV 50 by reception of electric power supplied from EVSE 40; and a configuration that allows electric power of battery 110 mounted in EV 50 to be supplied (discharged) to EVSE 40. However, for example, EV 50 may have only a configuration that allows charging of battery 110 provided therein by reception of electric power supplied from EVSE 40.

Furthermore, in the above-described embodiment, the switching operation according to the DR request in a power grid has been described as an example of the switching operation corresponding to the transaction for electric power, but the transaction for electric power is not particularly limited to a transaction for levelling out electric power such as a demand response, but may include a transaction such as electric power dealings between individuals, for example.

Furthermore, in the description in the above embodiment, the threshold value compared with the number of times of turning on and off the relay at the time of DR is a predetermined value, but the threshold value may be decreased over time, for example, or may be decreased as the remaining number of switchable times of the relay decreases. The remaining number of switchable times is calculated, for example, by subtracting the number of switching times in the actual utilization period of EV 50 (for example, the actual utilization period) from the upper limit value of the number of switchable times in the expected utilization period (for example, the expected utilization period) of EV 50.

Furthermore, in the description in the above embodiment, the process of notifying a user of a candidate vehicle showing an exclusion flag in an ON state is performed when the exclusion flag is turned on, but the notification process may be omitted.

The flowchart illustrating the process in above-described case corresponds to the flowchart shown in FIG. 7 from which the process in S114 is removed. Thus, the detailed description thereof will not be repeated.

Furthermore, in the description in the above embodiment, the initialization condition includes a condition that the date has changed, but, for example, the initialization condition only has to specify that a prescribed time period has elapsed and is not particularly limited to the condition that the date has changed.

Furthermore, in the description in the above embodiment, the relay switching operation according to the DR request is prohibited when the number of times of turning on and off the relay at the time of DR exceeds a threshold value. However, for example, when the estimated value of the number of switching times of the relay in the remaining utilization period of EV 50 is greater than the number of switchable times in the remaining utilization period, the relay switching operation according to the DR request may be prohibited.

In this case, the remaining utilization period of EV 50 is calculated by subtracting the actual utilization period from the expected utilization period of EV 50. Furthermore, the remaining number of switchable times in the remaining utilization period of EV 50 is calculated by subtracting the actual number of switching times of the relay in the actual utilization period of EV 50 from the upper limit value of the number of switchable times of the relay in the expected utilization period of the vehicle, as described above. Furthermore, the estimated value of the number of switching times in the remaining utilization period of EV 50 is calculated from the actual number of switching times in the actual utilization period.

Figure 10:
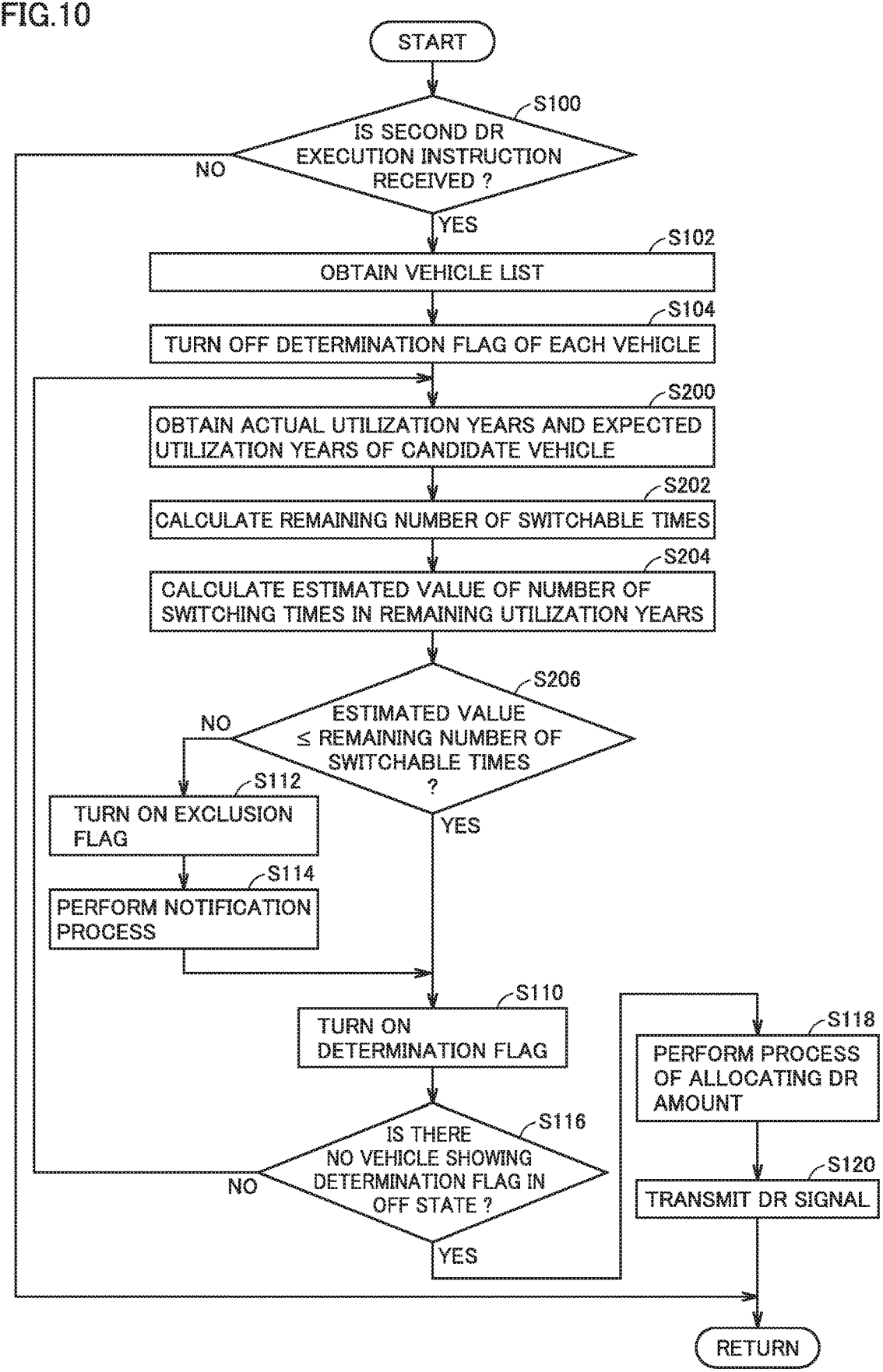
FIG. 10 is a flowchart illustrating an example of a process performed in a server in a modification.

The following is an explanation about the process performed in server 30 in the present modification with reference to FIG. 10. In the following description, the "remaining utilization period", the "expected utilization period", and the "actual utilization period" are defined by way of example as "remaining utilization years", "expected utilization years", and "actual utilization years", respectively. In this case, however, the "period" is not particularly limited to "years". FIG. 10 is a flowchart illustrating an example of the process performed in server 30 in a modification.

In the flowchart in FIG. 10, the same steps as those in the flowchart in FIG. 7 are designated by the same step numbers as those in the flowchart in FIG. 7. Thus, the detailed description of the same steps will not be repeated except for the point described below. It should be noted that the flowchart in FIG. 10 does not includes the steps corresponding to S122, S124, and S126 illustrated in the flowchart in FIG. 7.

In S104, when the determination flag of each candidate vehicle is turned off, the process proceeds to S200. In S200, server 30 obtains the actual utilization years and the expected utilization years of a candidate vehicle as a determination target. Server 30 may obtain actual utilization years, for example, by receiving the actual utilization years and the expected utilization years from the candidate vehicle as a determination target. Furthermore, server 30 may obtain expected utilization years, for example, by reading the expected utilization years of the candidate vehicle as a determination target from memory 33 storing the expected utilization years in advance.

In S202, server 30 calculates the remaining number of switchable times. Server 30 calculates the remaining number of switchable times in the remaining utilization years, for example, by subtracting the actual number of switching times of the relay of the candidate vehicle as a determination target from the upper limit value of the number of switchable times of the relay in the expected utilization years of the candidate vehicle as a determination target. The upper limit value of the number of switchable times of the relay in the expected utilization years, for example, may be received by a candidate vehicle as a determination target or may be read from memory 33 storing this upper limit value in advance.

In S204, server 30 calculates the estimated value of the number of switching times of the relay in the remaining utilization years. Server 30 calculates the estimated value of the number of switching times of the relay in the remaining utilization years, for example, from the actual number of switching times of the relay in the actual utilization years. Server 30 calculates the estimated value, for example, such that the ratio between the actual utilization years and the actual number of switching times is equal to the ratio between the remaining utilization years and the estimated value.

In S206, server 30 determines whether or not the estimated value of the number of switching times of the relay in the remaining utilization years is equal to or less than the remaining number of switchable times. When it is determined that the estimated value of the number of switching times of the relay in the remaining utilization years is equal to or less than the remaining number of switchable times (YES in S206), the process proceeds to S110.

On the other hand, when it is determined that the estimated value of the number of switching times of the relay in the remaining utilization years is greater than the remaining number of switchable times (NO in S206), the process proceeds to S112.

In this way, the utilization years and the expected utilization years of the candidate vehicle are obtained (S200), the remaining number of switchable times is calculated (S202), and the estimated value of the number of switching times in the remaining utilization years is calculated (S204). In this case, when the estimated value is greater than the remaining number of switchable times (NO in S206), the exclusion flag is turned on (S112) and the notification process is performed (S114). This can suppress exceeding of the upper limit value of the number of switchable times of the relay in a time period until the expected utilization years of the candidate vehicle elapse. Thus, shortening of the lifetime of the relay can be suppressed.

Furthermore, in the description in the above embodiment, the relay switching operation according to the DR request is prohibited when the number of times of turning on and off the relay at the time of DR exceeds a threshold value. However, for example, it may be selected whether or not to prohibit the switching operation, for example, depending on whether the electric power transmitted and received between EVSE 40 and EV 50 is AC power or DC power.

For example, when the electric power transmitted and received between EVSE 40 and EV 50 is AC power and when the number of times of turning on and off the relay at the time of DR exceeds a threshold value, server 30 prohibits the relay switching operation according to the DR request. Furthermore, for example, when the electric power transmitted and received between EVSE 40 and EV 50 is DC power, and when the number of times of turning on and off the relay at the time of DR exceeds a threshold value, server 30 may notify the user of the candidate vehicle as a determination target that the number of times of turning on and off the relay at the time of DR exceeds the threshold value.

Figure 11:
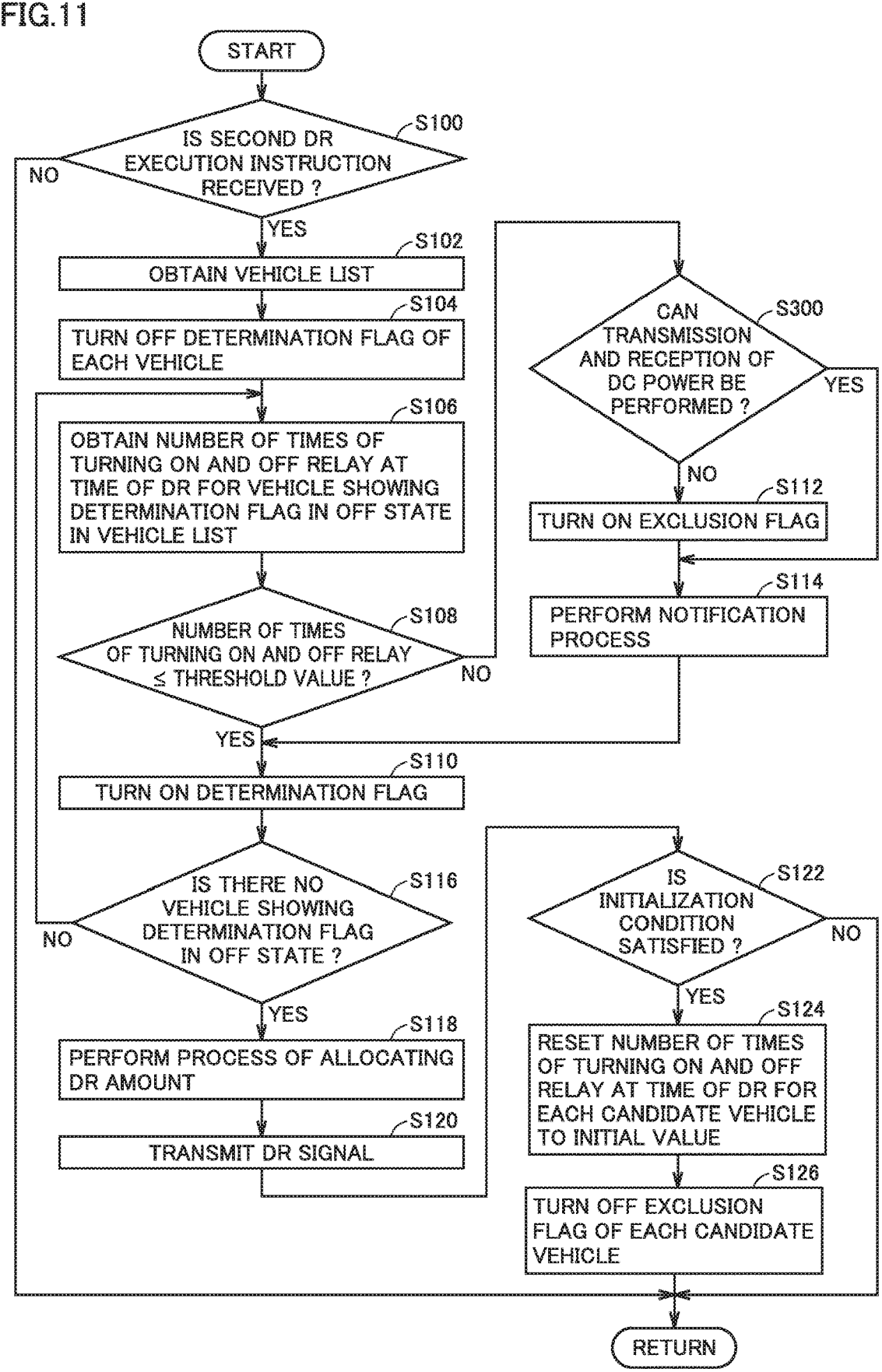
FIG. 11 is a flowchart illustrating another example of the process performed in the server in the modification.

The following is an explanation about the process performed in server 30 in the present modification with reference to FIG. 11. FIG. 11 is a flowchart illustrating another example of the process performed in server 30 in the modification.

In the flowchart in FIG. 11, the same steps as those in the flowchart in FIG. 7 are designated by the same step numbers as those in the flowchart in FIG. 7. Thus, the detailed description of the same steps will not be repeated except for the point described below.

When it is determined in S108 that the number of times of turning on and off the relay at the time of DR is greater than the threshold value (NO in S108), the process proceeds to S300.

In S300, server 30 determines whether the candidate vehicle as a determination target is capable of transmitting and receiving DC power to and from EVSE 40. Server 30 performs the process of inquiring of the candidate vehicle as a determination target whether transmission and reception of DC power can be performed or not. Then, when server 30 receives the information showing the state where transmission and reception of DC power can be performed, such as the state where a connector is connected to DC inlet 59B, it determines that transmission and reception of DC power can be performed. When it is determined that DC power is transmitted and received (YES in S300), the process proceeds to S114.

In this way, when the number of times of turning on and off the relay at the time of DR exceeds the threshold value (NO in S108), and when transmission and reception of DC power can be performed (YES in S300), the notification process is performed without excluding the target vehicle as a candidate vehicle (S114). On the other hand, when transmission and reception of DC power cannot be performed (NO in S300), the target vehicle is excluded from a candidate vehicle (S112), and the notification process is performed (S114).

In this way, for example, when battery 110 is charged with DC power, the switching operation is permitted, thereby allowing the switching operation that matches with the intention of the user who wants to immediately complete charging of battery 110. Also, the process of determining whether transmission and reception of DC power can be performed or not may be replaced with the process of determining whether DC power is transmitted and received or not.

Furthermore, in the description in the above embodiment, server 30 determines whether the number of times of turning on and off the relay at the time of DR for each candidate vehicle is equal to or less than a threshold value. Then, for the candidate vehicle as determined that this number of times exceeds the threshold value, the exclusion flag is turned on to thereby prohibit the switching operation according to a request. However, alternatively, EV 50 may receive a DR signal from server 30. Then, when the number of switching times of the relay according to the DR request exceeds a threshold value, the switching operation according to the DR request may be prohibited.

Furthermore, in EV 50, in the case where the switching operation not according to the request from a prescribed request source (that is, server 30) is performed, when the number of switching times according to the DR request (the number of times of turning on and off the relay at the time of DR) exceeds a threshold value, the user of EV 50 may be notified that the number of switching times according to the DR request exceeds the threshold value.

Figure 12:
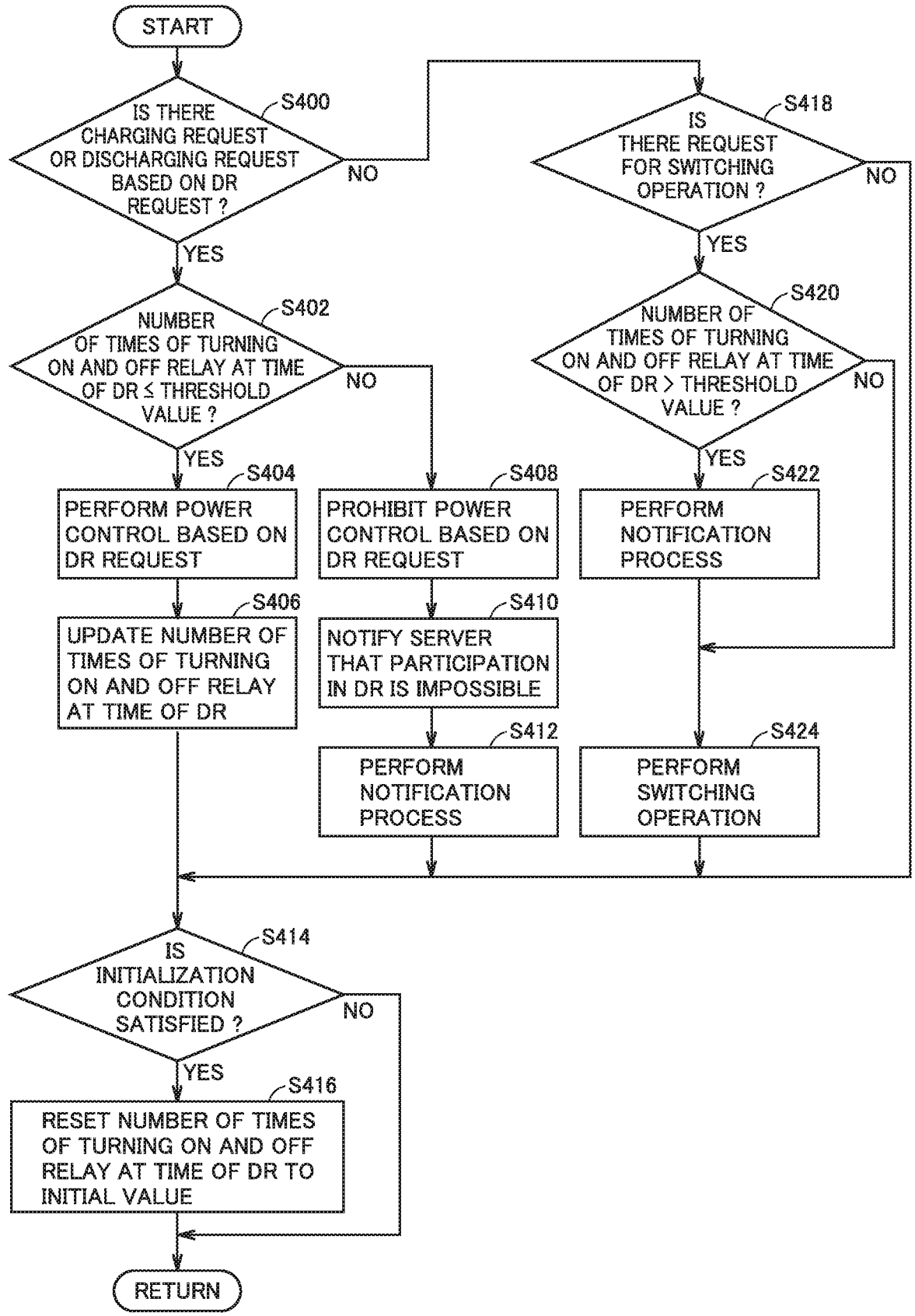
FIG. 12 is a flowchart illustrating an example of a process performed in an EV in the modification.

The following is an explanation about the process performed in EV 50 in the present modification with reference to FIG. 12. FIG. 12 is a flowchart illustrating an example of the process performed in EV 50 in the modification.

In S400, EV 50 (specifically, ECU 200) determines whether or not there is one of a charging request and a discharging request based on the DR request. When EV 50 receives a DR signal from server 30, for example, it determines that there is one of a charging request and a discharging request based on the DR request. When it is determined that there is one of a charging request and a discharging request based on the DR request (YES in S400), the process proceeds to S402.

In S402, EV 50 determines whether or not the number of times of turning on and off the relay at the time of DR is equal to or less than a threshold value. The threshold value is the same as the threshold value described in S108, and therefore, the detailed description thereof will not be repeated. When EV 50 determines that the number of times of turning on and off the relay at the time of DR is equal to or less than the threshold value (YES in S402), the process proceeds to S404.

In S404, EV 50 performs power control based on the DR request. For example, when charging is requested according to the DR request, EV 50 performs charging control (including controlling AC relay 57 and pre-charge relay 56a to be turned on). Furthermore, for example, when discharging is requested according to the DR request, EV 50 performs discharging control (including controlling AC relay 57 and pre-charge relay 56a to be turned on).

In S406, EV 50 updates the number of times of turning on and off the relay at the time of DR. In other words, the sum total of the number of times of turning on the relay and the number of times of turning off the relay during the power control in response to the DR signal is added to the previous value, to thereby update the number of times of turning on and off the relay at the time of DR. Then, the process proceeds to S414.

When it is determined that the number of times of turning on and off the relay at the time of DR is greater than the threshold value (NO in S402), the process proceeds to S408.

In S408, EV 50 prohibits the power control based on the DR request. Thus, in each of the cases where charging is subsequently requested according to the DR request and where discharging is subsequently requested according to the DR request, EV 50 does not perform power control according to these requests.

In S410, EV 50 notifies server 30 that participation in DR is impossible. When server 30 receives the notification from EV 50 that participation in DR is impossible, server 30 may exclude EV 50 from the candidate vehicles in the subsequent process of allocating a DR amount so as not to transmit a DR signal to EV 50.

In S412, EV 50 performs a notification process. EV 50 notifies the user, for example, that participation in DR is impossible since the number of times of turning on and off the relay at the time of DR exceeds a threshold value. EV 50 may notify portable terminal 80 of the user who owns EV 50, for example, through server 30, that participation in DR is impossible. Then, the process proceeds to S414.

In S414, EV 50 determines whether the initialization condition is satisfied or not. Since the initialization condition is as described above, the detailed description thereof will not be repeated. When it is determined that the initialization condition is satisfied (YES in S414), the process proceeds to S416.

In S416, EV 50 resets the number of times of turning on and off the relay at the time of DR to an initial value (zero). When it is determined that there is no charging request or discharging request based on the DR request (NO in S400), the process proceeds to S418.

When a DR signal is not received from server 30 (NO in S400), the process proceeds to S418.

In S418, EV 50 determines whether there is a request for the relay switching operation or not. For example, when EVSE 40 receives a charging request or a discharging request according to the DR request from a request source different from server 30, and when execution of the charging control or the discharging control of battery 110 is requested based on the charging schedule set in advance or the discharging schedule set in advance, EV 50 determines that there is a request for the relay switching operation. When it is determined that there is a request for the relay switching operation (YES in S418), the process proceeds to S420.

In S420, EV 50 determines whether the number of times of turning on and off the relay at the time of DR exceeds a threshold value or not. When it is determined that the number of times of turning on and off the relay at the time of DR exceeds the threshold value (YES in S420), the process proceeds to S422.

In S422, EV 50 performs a notification process. The notification process is to notify the user that the number of times of turning on and off the relay at the time of DR exceeds a threshold value. EV 50 may notify portable terminal 80 of the user who owns EV 50, for example, through server 30, that the number of times of turning on and off the relay at the time of DR exceeds the threshold value. Then, the process proceeds to S424. When it is determined that the number of times of turning on and off the relay at the time of DR is equal to or less than the threshold value (NO in S420), the process proceeds to S424. In S424, EV 50 performs the relay switching operation. When it is determined that there is no request for the relay switching operation (NO in S418), the process proceeds to S414.

In this way, when EV 50 receives a DR signal from server 30 (YES in S400), it is determined whether or not the number of times of turning on and off the relay at the time of DR is equal to or less than the threshold value (S402).

When the number of times of turning on and off the relay at the time of DR exceeds the threshold value, the power control based on the DR request is prohibited, to thereby prohibit the relay switching operation (S408). Then, server 30 is notified that participation in DR is impossible (S410), and the process of giving a notification to the user is performed (S412).

Thus, when the number of times of turning on and off the relay at the time of DR exceeds the threshold value, the relay switching operation according to the DR request is prohibited. Thereby, an increase in the number of switching times of the relay can be suppressed. Thus, shortening of the lifetime of the relay can be suppressed. Furthermore, since the switching operation not according to the DR request is not prohibited, required power transmission and reception (charging or discharging) can be performed.

Furthermore, when a DR signal is not received from server 30 (NO in S400), the relay switching operation is requested (YES in S418), and the number of times of turning on and off the relay at the time of DR exceeds a threshold value (YES in S420), then, the notification process is performed (S422), and the switching operation is performed (S424).

Accordingly, when performing the switching operation not according to the request from a prescribed request source (that is, server 30), the user of EV 50 can recognize that the number of switching times according to the request exceeds the threshold value. It should be noted that the switching operation not according to the request from a prescribed request source includes a switching operation performed in the case where it is unknown whether there is a request or not.

The above-described modifications may be wholly or partially combined as appropriate for implementation.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle management apparatus that manages a vehicle including a power storage device and allowing transmission and reception of electric power between the power storage device and a power grid external to the vehicle, wherein
the vehicle includes a relay that is
brought into a closed state when transmission and reception of electric power between the power grid and the power storage device is requested, and
brought into an opened state when transmission and reception of electric power between the power storage device and the power grid is requested to be stopped,
the vehicle management apparatus
obtains, from the vehicle, a number of switching times that is a number of times of performing a switching operation for switching a state of the relay between the opened state and the closed state from one to the other,
when the number of switching times exceeds a threshold value, prohibits the switching operation corresponding to a transaction for electric power,
sums a number of switching times corresponding to the transaction for electric power until a prescribed time period elapses, and
when a sum of the number of switching times exceeds the threshold value, prohibits the switching operation corresponding to the transaction for electric power.

2. The vehicle management apparatus according to claim 1, wherein
when the number of switching times corresponding to the transaction for electric power exceeds the threshold value, the vehicle management apparatus prohibits the switching operation corresponding to the transaction for electric power and permits the switching operation not corresponding to the transaction for electric power.

3. The vehicle management apparatus according to claim 1, wherein
the vehicle management apparatus
when the prescribed time period elapses, sets the number of switching times back to an initial value.

4. The vehicle management apparatus according to claim 1, wherein
the vehicle management apparatus
calculates a remaining number of switchable times of the relay in a remaining utilization period of the vehicle based on an actual number of switching times of the relay in an actual utilization period of the vehicle and a number of switchable times of the relay in an expected utilization period of the vehicle, wherein the remaining utilization period is calculated by subtracting the actual utilization period from the expected utilization period,
calculates an estimated value of the number of switching times in the remaining utilization period based on the actual number of switching times in the actual utilization period, and
when the estimated value is greater than the remaining number of switchable times, prohibits the switching operation corresponding to the transaction for electric power.

5. The vehicle management apparatus according to claim 1, wherein
when the switching operation corresponding to the transaction for electric power is prohibited, the vehicle management apparatus notifies a user of the vehicle that the number of switching times exceeds the threshold value.

6. The vehicle management apparatus according to claim 1, wherein
when electric power transmitted and received between the power grid and the vehicle is DC power, and when the number of switching times exceeds the threshold value, the vehicle management apparatus permits the switching operation.

7. The vehicle management apparatus according to claim 6, wherein
the vehicle management apparatus
prohibits the switching operation corresponding to the transaction for electric power, when electric power transmitted and received between the power grid and the vehicle is AC power and when the number of switching times exceeds the threshold value, and
notifies a user of the vehicle that the number of switching times exceeds the threshold value, when electric power transmitted and received between the power grid and the vehicle is DC power and when the number of switching times exceeds the threshold value.

8. A vehicle comprising:
a power storage device;
a relay that is
brought into a closed state when transmission and reception of electric power between a power grid external to the vehicle and the power storage device is requested, and
brought into an opened state when transmission and reception of electric power between the power storage device and the power grid is requested to be stopped; and
a controller that performs a switching operation for switching a state of the relay between the opened state and the closed state from one to the other, wherein
when a number of switching times that is a number of times of performing the switching operation exceeds a threshold value, the controller prohibits the switching operation corresponding to a transaction for electric power,
the controller sums a number of switching times corresponding to the transaction for electric power until a prescribed time period elapses, and
when a sum of the number of switching times exceeds the threshold value, the controller prohibits the switching operation corresponding to the transaction for electric power.

9. The vehicle according to claim 8, wherein
in a case where the controller performs the switching operation not corresponding to a transaction for electric power with a prescribed customer, when the number of switching times corresponding to the transaction for electric power exceeds the threshold value, the controller permits the switching operation and notifies a user of the vehicle that the number of switching times corresponding to the transaction for electric power exceeds the threshold value.

10. A vehicle management method of managing a vehicle that includes a power storage device and allows transmission and reception of electric power between the power storage device and a power grid external to the vehicle,
the vehicle including a relay that is
brought into a closed state when transmission and reception of electric power between the power grid and the power storage device is requested, and
brought into an opened state when transmission and reception of electric power between the power storage device and the power grid is requested to be stopped,
the vehicle management method comprising:
obtaining, from the vehicle, a number of switching times that is a number of times of performing a switching operation for switching a state of the relay between the opened state and the closed state from one to the other;
when the number of switching times exceeds a threshold value, prohibiting the switching operation corresponding to a transaction for electric power;
summing a number of switching times corresponding to the transaction for electric power until a prescribed time period elapses, and
when a sum of the number of switching times exceeds the threshold value, prohibiting the switching operation corresponding to the transaction for electric power.

* * * * *